United States Patent [19]

Dannheim et al.

[11] Patent Number: 5,225,544
[45] Date of Patent: Jul. 6, 1993

[54] FIBER REACTIVE DYES WHICH CONTAIN A CYANOAMINOTRIAZINYL GROUP AND ONE OR TWO GROUPS OF THE VINYL SULFONE SERIES

[75] Inventors: Jörg Dannheim, Frankfurt am Main; Werner H. Russ, Flörsheim am Main, both of Fed. Rep. of Germany

[73] Assignee: Hoechst Aktiengesellschaft, Frankfurt am Main, Fed. Rep. of Germany

[21] Appl. No.: 975,429

[22] Filed: Nov. 12, 1992

[30] Foreign Application Priority Data

Nov. 14, 1991 [DE] Fed. Rep. of Germany ....... 4137464

[51] Int. Cl.$^5$ .............. C09B 62/443; C09B 62/503; D06P 1/384
[52] U.S. Cl. .................. 534/642; 534/617; 534/618; 534/629; 534/641; 540/126; 544/76; 544/193.1; 544/197; 544/198; 8/549
[58] Field of Search ............... 534/617, 618, 629, 641, 534/642; 540/126; 544/76, 193.1, 197, 198

[56] References Cited

U.S. PATENT DOCUMENTS 5,015,731  5/1991  Schwaiger et al. ................. 534/618

FOREIGN PATENT DOCUMENTS

WO90/13603  11/1990  World Int. Prop. O. .
WO90/13604  11/1990  World Int. Prop. O. .

OTHER PUBLICATIONS

Buech et al, *Chemical Abstracts*, vol. 114, No. 187558a (1991).
Buech et al, *Chemical Abstracts*, vol. 115, No. 51844d (1991).

*Primary Examiner*—Mary G. Lee
*Assistant Examiner*—Fiona T. Powers
*Attorney, Agent, or Firm*—Connolly & Hutz

[57] ABSTRACT

Water-soluble dyes are described, such as azo dyes, metal complex dyes, anthraquinone, phthalocyanine and formazan dyes, which contain a fiber-reactive group of the vinyl sulfone series which, if desired, is bound via a bridging member, and furthermore contain a 4-cyanamido-1,3,5-triazin-6-ylamino radical which is substituted in the 2 position by a group of the formula (2)

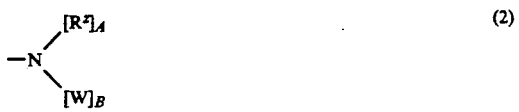

in which $R^z$ is hydrogen or a lower alkyl group which is unsubstituted or substituted by alkyl, hydroxy, cyano, lower alkoxy, carboxyl, sulfamoyl, sulfo or sulfato or by a substituted or unsubstituted phenyl radical or is a cyclohexyl radical or a substituted or unsubstituted phenyl radical, W is an aryl, alkylenearyl, arylenealkyl, alkylenearylenealkyl or arylenealkylenearyl radical substituted by 1 to 4 water-solubilizing substituents, it being possible for these aryl, arylene, alkyl and alkylene radicals to be additionally substituted and/or interrupted by hetero groups, A is the number zero or 1, and B is the number 1 or 2, the sum of (A+B) being the number 2. The dyes are fiber-reactive and are suitable for the dyeing of hydroxy- and/or carboxamido-containing material, in particular fiber material, such as cotton, wool, silk and synthetic polyamide, by the procedures known for fiber-reactive dyes.

10 Claims, No Drawings

FIBER REACTIVE DYES WHICH CONTAIN A CYANOAMINOTRIAZINYL GROUP AND ONE OR TWO GROUPS OF THE VINYL SULFONE SERIES

DESCRIPTION

The invention is in the technical field of fiber-reactive dyes.

Fiber-reactive dyes containing a fiber-reactive group from the vinyl sulfone series and furthermore an s-triazinylamino radical substituted by a cyanamido group are disclosed in PCT Published Patent Applications Nos. WO 90/13,603 and WO 90/13,604.

The practice of dyeing with reactive dyes has recently led to increased demands on the quality of the dyeings and the economy of the dyeing process. Accordingly, there is still a need for new fiber-reactive dyes exhibiting improved properties, in particular in terms of practical application. Moreover, there is an increasing demand for dyes which are dischargeable to white in high quality and are thus highly suitable not only for discharge printing but also for resist printing.

Using the present invention, new, valuable fiber-reactive dyes of the formula (1) mentioned and defined below have now been found, which dyes have very good properties in practical application and moreover are highly suitable for discharge and resist printing, which is the reason why they can be used for the dyeing of fiber materials in a wider application range. In discharge printing, a dyed fabric web (ground) is printed with a discharging agent in a desired pattern; the discharging agent destroys the dye, if dischargeable, so that, after completion of the discharge process, a white pattern is obtained on top of the dyeing discharge to white). If the impressed discharge additionally contains a discharge-resistant dye, a printing pattern in a different color (colored discharge) is obtained on the ground after completion of the discharge process and customary treatment for fixing this added dye. In resist printing, the fabric is first printed with a suitable resisting agent in a desired pattern. The fabric thus pre-printed is then cross-dyed (cross-padded or cross-printed) with a dye which can combine with the resisting agent and is thus no longer capable of being fixed on the fabric, as a result of which no dye fixation takes place in the resist-printed areas and the dyeing obtained consequently exhibits a white pattern corresponding to the pattern of the resisting agent.

The new dyes according to the invention have the formula (1)

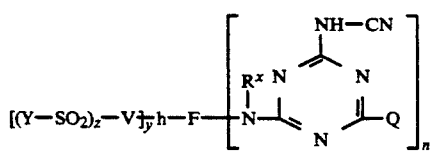

in which

F is the radical of a monoazo, disazo or polyazo dye or of a heavy metal complex azo dye derived therefrom or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dye;

$R^x$ is a hydrogen atom or an alkyl group of 1 to 4 carbon atoms, such as a methyl or ethyl group, which can be substituted by halogen, such as chlorine and bromine, hydroxy, cyano, alkoxy of 1 to 4 carbon atoms, such as methoxy and ethoxy, alkoxycarbonyl of 2 to 5 carbon atoms, carboxy, sulfamoyl, sulfo or sulfato, preferably a methyl or ethyl group and in particular a hydrogen atom;

n is the number 1 or 2, preferably 1;

Q is a group of the formula (2)

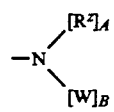

in which $R^z$ is a hydrogen atom or an alkyl group of 1 to 4 carbon atoms, such as, in particular, a methyl or ethyl group, which can be substituted by halogen, such as chlorine and bromine, hydroxy, cyano, alkoxy of 1 to 4 carbon atoms, such as methoxy and ethoxy, carboxy, sulfamoyl, sulfo or sulfato or by a phenyl radical which is unsubstituted or substituted by substituents from the group comprising halogen, such as chlorine and bromine, alkoxy of 1 to 4 carbon atoms, such as methoxy and ethoxy, alkyl of 1 to 4 carbon atoms, such as methyl, sulfo and carboxy, or is a cyclohexyl radical or a phenyl radical which is unsubstituted or substituted by substituents from the group comprising halogen, such as chlorine and bromine, alkoxy of 1 to 4 carbon atoms, such as methoxy and ethoxy, alkyl of 1 to 4 carbon atoms, such as methyl, sulfo and carboxy, W is an aryl, alkylenearyl, arylenealkyl, alkylenearylenealkyl or arylenealkylenearyl radical substituted by 1 to 4, preferably 1 or 2, water-solubilizing substituents, the alkylene radicals or alkyl radicals being those having 1 to 8, preferably 2 to 6, in particular 2 to 4, carbon atoms which can additionally be substituted by other substituents and the arylene radicals and aryl radicals being phenylene or naphthylene radicals and phenyl or naphthyl radicals which are unsubstituted or additionally substituted by other substituents, it being possible for the alkylene radicals to be interrupted by 1 or more, such as 2 or 3, hetero groups, such as —NH—, —N(R)—where R is alkyl of 1 to 4 carbon atoms, which can be substituted by sulfo, carboxy, sulfato, phenyl or sulfophenyl, —O—, —S—, —SO₂—, —CO—, —SO₂—, NH—, —NH—SO₂—, —NH—CO— and —CO—NH—, and it being possible for the alkylene and arylene moieties and alkyl and aryl moieties in the combined alkyl(ene)/aryl(ene) radicals to be separated from one another in each case by such a group, A is the number zero or 1, and B is the number 1 or 2, the sum of (A+B) being the number 2, it being possible for the groups of the formula —W—(SO₂—Y)$_z$, in the case where B is 2, to have meanings which are identical to or different from one another;

V is a direct bond or an alkylene group or is a substituted or unsubstituted arylene or alkylenearylene or arylenealkylene or alkylenearylenealkylene or arylenealkylenearylene radical, or is an arylenearylene radical which is interrupted by one of the hetero groups listed below, the alkylene radicals being those having 1 to 8, preferably 2 to 6, in particular 2 to 4, carbon atoms which can be substituted, for example, by sulfo, carboxy, sulfato and/or phosphato, and the arylene radicals being substituted or unsubstituted phenylene or naphthylene radicals, it being possible for the alkylene radicals to be interrupted by 1 or more, such as 2 or 3, hetero groups, such as —NH—, —N(R)—where R is alkyl of 1 to 4 carbon atoms which can be substituted by sulfo, carboxy, sulfato, phenyl or sulfophenyl, —O—, —S—, —SO$_2$—, —CO—, —SO$_2$—NH—, —NH—SO$_2$—, —NH—CO—and —CO—NH—, and it being possible for the alkylene and arylene moieties in the combined alkylene-/arylene radicals to be separated from one another in each case by such a hetero group;

y is the number 1 or 2;

z is the number 1 or 2;

h is a nitrogen atom in the case where y is 2, or is a group of the formula —NH—, N(R)—where R has one of the abovementioned meanings, —NH—CO—NH—, —NH—CO—or —CO—NH—or, preferably, a direct bond in the case where y is 1;

Y is a vinyl group or an ethyl group containing, in the β position, a substituent which can be eliminated by alkali, such as a β-sulfatoethyl, β-thiosulfatoethyl or β-phosphatoethyl group or a β-alkanoyloxyethyl group having 2 to 5 carbon atoms in the alkanoyl radical, such as a β-acetyloxyethyl group, or a β-benzoyloxyethyl, β-(sulfobenzoyloxy)ethyl or a β-(p-toluenesulfonyloxy)ethyl group or a β-haloethyl group, such as a β-bromoethyl or β-chloroethyl group, preferably a vinyl group and in particular a β-sulfatoethyl group, it being possible for the group(s) —SO$_2$—Y to be bound to an aromatic carbon atom of F or V by an alkylene radical of 1 to 4 carbon atoms, such as a methylene group, or by an alkylamino group of 1 to 4 carbon atoms, such as a methylamino or ethylamino group.

Preferably, F is the radical of a mono- or disazo dye or the radical of a metal complex azo dye, such as of a 1:1 copper complex o,o'-monoazo or -disazo dye, or of a triphendioxazine, anthraquinone or phthalocyanine dye, such as of a copper phthalocyanine dye.

The radical F can contain, in its basic structure, the substituents customary for organic dyes. Examples of such substituents are: alkyl groups of 1 to 4 carbon atoms, such as methyl, ethyl, propyl, isopropyl or butyl, of these preferably ethyl and in particular methyl; alkoxy groups of 1 to 4 carbon atoms, such as methoxy, ethoxy, propoxy, isopropoxy and butoxy, of these preferably ethoxy and in particular methoxy; acylamino groups of 2 to 8 carbon atoms, such as an acetylamino, propionylamino or benzoylamino group; primary and mono- or disubstituted amino groups, examples of substituents being alkyl groups of 1 to 4 carbon atoms and/or phenyl groups, such as monoalkylamino and dialkylamino groups having to 4 carbon atoms in the alkyl radical, phenylamino or N—(C$_1$—C$_4$-alkyl)—N—phenylamino groups, it being possible for the alkyl radicals to be additionally substituted, for example by phenyl, sulfophenyl, hydroxy, sulfato, sulfo and carboxy, and for the phenyl groups to be additionally substituted, such as by chlorine, sulfo, carboxy, methyl and/or methoxy, thus for example methylamino, ethylamino, propylamino, isopropylamino, butylamino, N,N-di-(β-hydroxyethyl)amino, N,N-di-(β-sulfatoethyl)amino, sulfobenzylamino, N,N-di-(sulfobenzyl)amino and diethylamino groups and phenylamino and sulfophenylamino groups; alkoxycarbonyl groups having an alkyl radical of 1 to 4 carbon atoms, such as methoxycarbonyl and ethoxycarbonyl; alkylsulfonyl groups of 1 to 4 carbon atoms, such as methylsulfonyl and ethylsulfonyl; trifluoromethyl, nitro and cyano groups; halogen atoms, such as fluorine, chlorine and bromine; carbamoyl groups, which can be mono- and disubstituted by alkyl of 1 to 4 carbon atoms, it being possible for the alkyl radicals to be substituted in turn, for example by hydroxy, sulfato, sulfo, carboxy, phenyl and sulfophenyl, such as, for example, N-methylcarbamoyl and N-ethylcarbamoyl; sulfamoyl groups, which can be mono- or disubstituted by alkyl groups of 1 to 4 carbon atoms, and N-phenyl-N-alkylsulfamoyl groups having an alkyl group of 1 to 4 carbon atoms, it being possible for these alkyl groups to be substituted in turn by hydroxy, sulfato, sulfo, carboxy, phenyl and sulfophenyl, such as, for example, N-methylsulfamoyl, N-ethylsulfamoyl, N-propylsulfamoyl, N-isopropylsulfamoyl, N-butylsulfamoyl, N-(β-hydroxyethyl)sulfamoyl and N,N-di-(β-hydroxyethyl)sulfamoyl; N-phenylsulfamoyl, ureido, hydroxy, carboxy, sulfomethyl and sulfo groups.

The dyestuff radical F is preferably substituted by one or more, such as 2 to 4, sulfo groups, and it can furthermore preferably contain substituents selected from the group comprising sulfo, methyl, ethyl, methoxy, ethoxy, alkanoylamino of 2 to 5 carbon atoms, such as acetylamino, benzoylamino, amino, chlorine, bromine, ureido, hydroxy, carboxy and sulfomethyl.

Examples of water-solubilizing groups in the radical W are the carboxy, sulfo, sulfato, phosphato, phosphono and phosphino groups.

In all of the above formulae, the individual formula members, not only those designated by different symbols but also those designated by the same symbol within a formula, can, within the scope of their meaning, have meanings which are identical to or different from one another.

The groups "sulfo", "carboxy", "phosphato", "phosphono", "phosphino", "thiosulfato" and "sulfato" not only include their acid form but also their salt form. Accordingly, sulfo groups are groups of the formula —SO$_3$M, carboxy groups groups of the formula —COOM, phosphato groups groups of the formula —OPO$_3$M$_2$, phosphono groups groups of the formula —OPO$_2$M$_2$, phosphino groups groups of the formula —PO$_2$M$_2$, thiosulfato groups groups of the formula —S—SO$_3$M and sulfato groups of the formula —O-SO$_3$M, in which M is a hydrogen atom or a salt-forming metal atom, such as an alkali metal, such as sodium, potassium or lithium.

Examples of formula radicals $R^x$ are: hydrogen, methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, methoxypropyl, β-chloroethyl, γ-bromopropyl, β-hydroxyethyl, β-hydroxybutyl, β-cyanoethyl, sulfomethyl, β-sulfoethyl, amidosulfonylmethyl and β-sulfatoethyl.

Examples of formula radicals $R^z$ are: hydrogen, methyl, ethyl, carboxymethyl, carbomethoxymethyl, carbethoxymethyl, sulfomethyl, sulfamidomethyl, β- carboxyethyl, β-sulfatoethyl, n-propyl, β-carboxypropyl, β-sulfatoethyl, β-ethoxyethyl, β-methoxyphypyl, γ-chloropropyl, γ-bromopropyl, n-butyl, isobutyl, cyclohexyl, phenyl, 2-chlorophenyl, 3-chlorophenyl, 4-chlorophenyl, 2- or 3- or 4-sulfophenyl, 2-methylphenyl, 4-methoxyphenyl, 3-methylphenyl and 4-ethylphenyl. Of these, preference is given to the substituted or unsubstituted alkyl groups and particular preference is given to the methyl and the ethyl group and the hydrogen atom.

In the radicals V and W, arylene radicals and aryl radicals are preferably phenylene and naphthylene radicals and phenyl and naphthyl radicals, which may contain one or more, such as 2 or 3, preferably 1 or 2, substituents belonging, for example, to the group of substituents comprising alkyl of 1 to 4 carbon atoms, such as methyl and ethyl, halogen, such as fluorine, chlorine and bromine, hydroxy, cyano, alkoxy of 1 to 4 carbon atoms, such as methoxy and ethoxy, sulfamoyl, trifluoromethyl and alkoxycarbonyl of 2 to 5 carbon atoms, such as methoxycarbonyl and ethoxycarbonyl, and, if necessary, to the group of water-solubilizing substituents. Of these, W is preferably a phenylene or phenyl radical, both of which can be substituted by the abovementioned substituents, the substituents from the group comprising alkyl of 1 to 4 carbon atoms, chlorine, alkoxy of 1 to 4 carbon atoms, carboxy and sulfo being preferred.

Alkyl and alkylene radicals in the radical W are preferably straight-chain and branched alkyl and alkylene groups of 2 to 6 carbon atoms, which can be interrupted by the hetero groups mentioned, such as 1 or 2 of these hetero groups, and, if necessary, substituted by one or more water-solubilizing groups. Of these, straightchain alkyl and alkylene groups of 2 to 4 carbon atoms or an alkyl or alkylene group of 4 carbon atoms interrupted by an oxygen atom or an amino or methylamino group are preferred. Particularly preferred alkyl radicals are the ethyl or n-propyl groups substituted by sulfo, carboxy, sulfato or phosphato. Examples of substituents in the alkylene groups of W can be sulfo, carboxy, hydroxy and cyano groups.

If the formula radical W is an alkylenearyl or an alkylenearylenealkyl radical, the alkyl or alkylene radical in these groups is preferably a straight-chain radical of 1 to 3 carbon atoms and the arylene radical is preferably a 1,3- or in particular 1,4-phenylene radical, which, if necessary, are substituted by one or more water-solubilizing groups. Alkylenearylene radicals and alkylenearyl radicals are in particular the radicals of the formulae -CH₂-CH₂-phenylene- and -CH₂-phenylene- or the phenethyl and benzyl groups substituted in the phenyl radical by sulfo and/or carboxy.

Examples of radicals of the formula (2) are: 2-sulfophenylamino, 3-sulfophenylamino, 4-sulfophenylamino, 2-carboxyphenylamino, 3-carboxyphenylamino, 4-carboxyphenylamino, 3,5-disulfophenylamino, 2-methyl-5-sulfophenylamino, 2-methyl-4-sulfophenylamino, 2,4-disulfophenylamino, 2-methyl-4,6-disulfophenylamino, 2-methyl-3,5-disulfophenylamino, 1-methyl-2,5-disulfophenylamino, 3,4-dicarboxyphenylamino, 2,5-dicarboxyphenylamino, 3,5-dicarboxyphenylamino, 2-hydroxy-3-carboxyphenylamino, β-carboxyethylamino, δ-carboxybutylamino, 1-carboxy-2-methyl-n-propylamino, 1-carboxy-3-methyl-n-butylamino, 1-carboxyethylamino, 2-sulfoethylamino, 3-phosphonophenylamino, 3-phosphinophenylamino and 4-phosphonophenylamino.

The formula radical V is preferably a direct bond. If V is an arylene radical, it is preferably a sulfosubstituted or unsubstituted naphthylene radical or a phenylene radical, which can be substituted by 1 or 2 substituents from the group comprising alkyl of 1 to 4 carbon atoms, alkoxy of 1 to 4 carbon atoms, halogen, such as chlorine and bromine, alkylsulfonyl of 1 to 4 carbon atoms, sulfo, carboxy and trifluoromethyl.

If V is an alkylene radical, it is preferably an alkylene radical of 2 to 6 carbon atoms, which, if desired, can be interrupted by one or more of the abovementioned hetero groups and substituted by one or more of the substituents mentioned.

Preferred radicals -V-h- are: 1,4-phenylene, 1,3-phenylene, 1,4-phenyleneamino, 1,3-phenyleneamino, 2-methyl-5-methoxy-1,4-phenylene-4-amino, 4-chloro-1,3-phenylene-3-amino, 4-hydroxy-1,3-phenylene-3-amino, 4-methoxy-1,3-phenylene-3-amino, 2,5-dimethoxy-1,4-phenylene-4-amino, 4-carboxy-1,3-phenylene-3-amino and radicals of the formulae

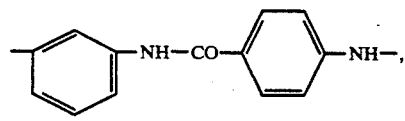

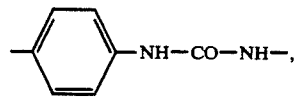

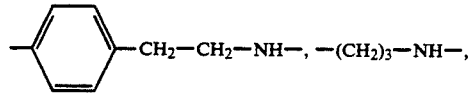

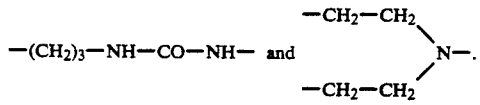

The grouping bound to the dye radical F and having the formula (3)

(3)

is preferably a radical of the formula (3a) or, particularly preferably, a radical of the formula (3b)

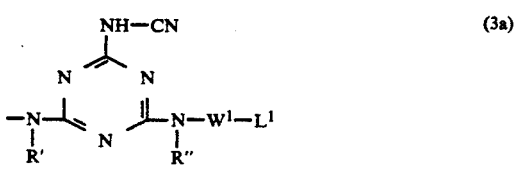

(3a)

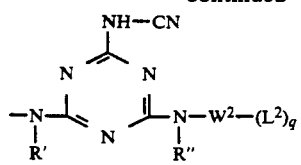 (3b)

in which
- R' is a methyl or ethyl group or, in particular, a hydrogen atom,
- R" is a hydrogen atom or a methyl or ethyl group,
- $W^1$ is an alkylene group of 4 to 6 carbon atoms which is interrupted by 1 or 2 oxygen atoms and/or amino groups, or is an alkylene group of 2 to 4 carbon atoms, preferably of 2 or, in particular, of 3 carbon atoms,
- $W^2$ is a phenylene radical, preferably a 1,3- or 1,4-phenylene radical, which can be substituted by 1 or 2 substituents from the group comprising methyl, methoxy, ethoxy and chlorine, or is a group of the formula (a)

—(CH$_2$)$_w$-phenylene— (a)

in which w is the number 1, 2, 3 or 4, preferably 2, and phenylene is a 1,3- or 1,4-phenylene radical,
- $L^1$ is sulfo, carboxy, sulfato or phosphato,
- $L^2$ is sulfo or carboxy, and
- q is the number 1 or 2.

Important azo dyes of the formula (1) are those in which F is a radical of a dye from the benzeneazonaphthol, benzeneazo-1-phenyl-5-pyrazolone, benzeneazobenzene, naphthaleneazobenzene, benzeneazoaminonaphthalene, naphthaleneazonaphthalene, naphthaleneazo-1-phenyl-5-pyrazolone, benzeneazopyridone and naphthaleneazopyridone series, the sulfo-containing dyes being preferred here too.

Of the 1:1 copper complex azo dyes according to the invention, those from the benzene and naphthalene series are preferred.

Examples of preferred azo dyes of the formula (1) are those of the formulae (4a) and (4b)

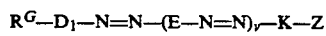 (4a)

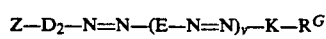 (4b)

and the heavy metal complex compounds derived therefrom, such as 1:1 copper complex compounds, in which
- $D_1$ is the radical of a diazo component from the benzene or naphthalene series,
- $D_2$ is the radical of a diazo component from the diaminobenzene or diaminonaphthalene series,
- E is the radical of a middle component from the benzene or naphthalene series,
- K is the radical of a coupling component from the benzene, naphthalene, pyrazolone, 6-hydroxy-2-pyridone or acetoacetarylamide series, it being possible for $D_1$, E and K to contain substituents customary for azo dyes, such as, for example, hydroxy, amino, methyl, methoxy, ethoxy, sulfo, carboxy, substituted or unsubstituted alkanoylamino groups of 2 to 4 carbon atoms in the alkanoyl radical, substituted or unsubstituted benzoylamino groups and halogen atoms, such as bromine and chlorine atoms, and $D_1$, E and K together containing at least two sulfo groups, preferably three or four sulfo groups,
- v is the number zero or 1,
- Z is a group of the formula (3) or, preferably, of the formula (3a) or (3b), and
- $R^G$ is a group of the formula (5)

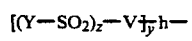 (5)

where Y, V, h, z and g have the abovementioned meaning.

Furthermore, preference is given to azo dyes of the formula (4c) or (4d)

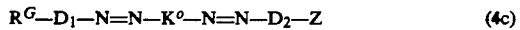 (4c)

 (rd)

in which $R^G$ has the abovementioned meaning, $D_1$ and $D_2$, independently of one another, are the radical of a diazo component from the benzene or naphthalene series and $K^o$ is the radical of a bivalent coupling component from the naphthalene series, it being possible for $D_1$, $D_2$ and $K^o$ to carry the substituents customary for azo dyes, such as the ones already mentioned above, $D_1$, $D_2$ and $K^o$ together containing at least two sulfo groups, preferably three or four sulfo groups.

Such azo dyes of the formula (1) are in particular dyes of the formulae (4e), (4f) and (4g)

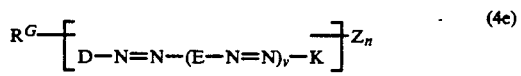 (4e)

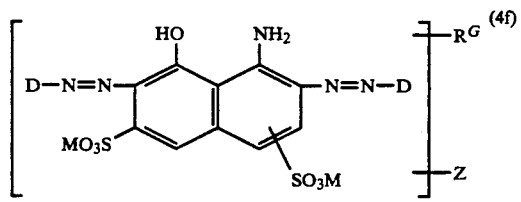 (4f)

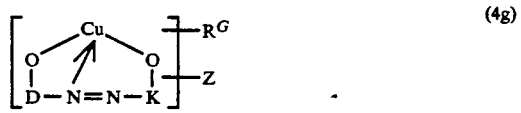 (4g)

in which
- $R^G$ has one of the above meanings and is bound to D or K,
- Z is a radical of the formula (3) or (3a) or (3b),
- n is the number 1 or 2, preferably 1, the radical Z is bound to the radical D or the radical K or, in the case where n is 2, both radicals Z are bound to D or K or one is bound to D and the other to K, $R^G$ and Z being preferably not bound to D and K simultaneously,
- each D is the radical of a diazo component to which additionally an azo radical can be bound and each of which can have a meaning which is identical to or different from that of the others and is, for example a radical $D_1$ of the meaning given above or below,
- E is the divalent radical of a couplable and diazotizable compound, for example of the meaning given above or below,
- K is the radical of a coupling component, for example of the meaning given above or below, to which additionally an azo radical can be bound, v is the number zero or 1, and M is a hydrogen atom or an alkali metal, such as sodium, potassium or lithium.

Examples of preferred metal complex azo dyes according to the invention are copper complex azo dyes of the formula (4)

(4h)

in which $D_1$, $R^G$, K, v and Z have one of the abovementioned meanings and $D_1$ is preferably a radical apparent below from formula (5c) or (5d), and $K^1$ is the radical of an amino- and hydroxy containing coupling component, such as, preferably, the radical of an aminonaphthol which is unsubstituted or substituted by 1 or 2 sulfo groups, the two oxy groups binding the copper in the form of a complex being bound to $D_1$ and $K^1$ in the ortho position or vicinal position relative to the azo group.

Examples of aromatic radicals of diazo components carrying a fiber-reactive group of the formula $Y-SO_2-$, such as of those of the formulae $R^G-D-NH_2$ and $R^G-D_1-NH_2$, are those of the formulae (5a), (5b), 5c) and (5d)

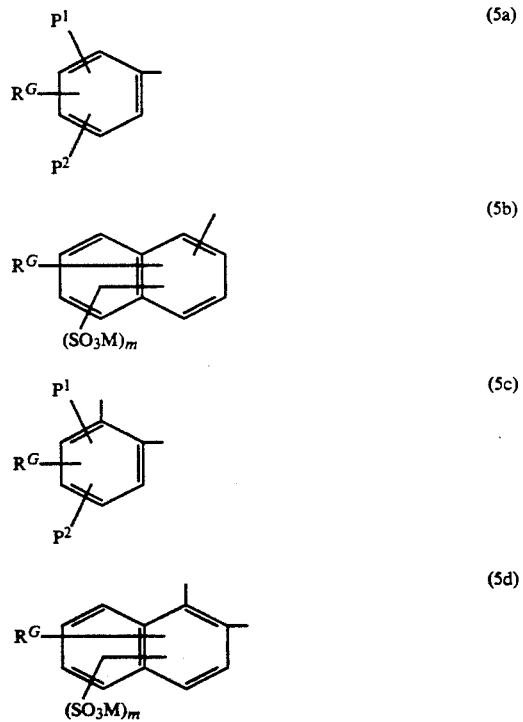

in which $R^G$ is a radical of the formula (5), $P^1$ is hydrogen, methyl, ethyl, methoxy, ethoxy, alkanoyl of 2 to 5 carbon atoms, such as acetyl and propionyl, cyano, carboxy, sulfo, alkoxycarbonyl of 2 to 5 carbon atoms, such as methoxycarbonyl and ethoxycarbonyl, carbamoyl, N-($C_1$-$C_4$-alkyl)-carbamoyl, fluorine, chlorine, bromine or trifluoromethyl, $P^2$ is hydrogen, methyl, ethyl, methoxy, ethoxy, cyano, carboxy, sulfo, alkanoylamino of 2 to 5 carbon atoms, such as acetylamino, alkoxycarbonyl of 2 to 5 carbon atoms, such as methoxycarbonyl and ethoxycarbonyl, carbamoyl, N-($C_1$-$C_4$-alkyl)sulfamoyl, alkylsulfonyl of 1 to 4 carbon atoms, phenylsulfonyl or phenoxy, it being possible for the benzene ring in formulae (5a) and (5b) to additionally contain a hydroxy group in the ortho position relative to the free bond leading to the azo group, m is the number zero, 1 or 2 (this group being a hydrogen atom in the case where p is zero) and M has the abovementioned meaning.

Of these, $P^1$ is preferably hydrogen, methyl, methoxy, bromine, chlorine, carboxy and sulfo and $P^2$ is preferably hydrogen, methyl, methoxy, chlorine, carboxy, sulfo and acetylamino.

Aromatic radicals of diaminobenzene and diaminonaphthalene compounds which serve as diazo components and have the formulae $H_2N-D-NH_2$ or $H_2N-D_2-NH_2$ containing the fiber-reactive radical Z, are preferably radicals of the formulae (6a) and (6b)

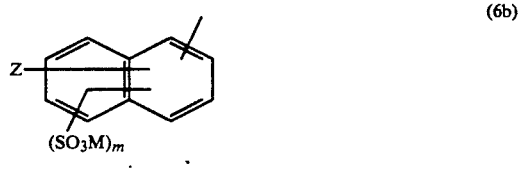

in which Z, M, m, $P^1$ and $P^2$ have the abovementioned, in particular preferred, meanings, it being possible for the benzene ring in formulae (6a) and (6b) to additionally contain a hydroxy group in the ortho position relative to the free bond leading to the azo group.

Examples of aromatic radicals E of a couplable and diazotizable compound of the formula H-E-$NH_2$ are those of the formulae (7a), (7b) and (7c)

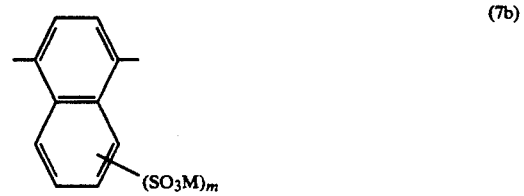

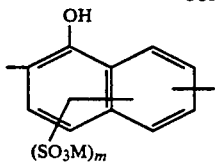

in which

P¹, M and m have the abovementioned meanings and
P³ is hydrogen, alkyl of 1 to 4 carbon atoms, such as methyl or ethyl, alkoxy of 1 to 4 carbon atoms, such as methoxy and ethoxy, chlorine, alkanoylamino of 2 to 5 carbon atoms, such as acetylamino and propionylamino, benzoylamino, ureido, phenylureido, alkylureido having to 4 carbon atoms in the alkyl radical, phenylsulfonyl or alkylsulfonyl of 1 to 4 carbon atoms.

Examples of radicals —K—R$^G$ of coupling components of the formula H—K—R$^G$ carrying the fiber-reactive group of the formula —SO₂—Y are those of the formulae (8a) to (8h)

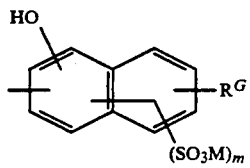

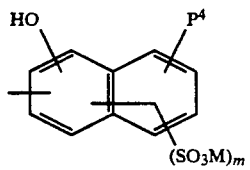

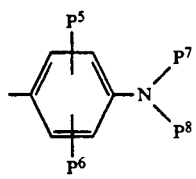

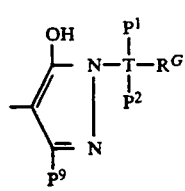

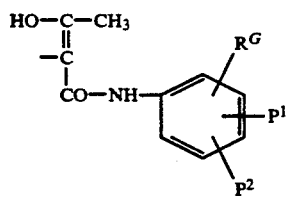

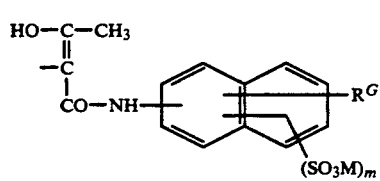

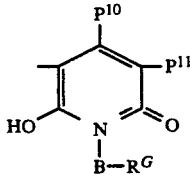

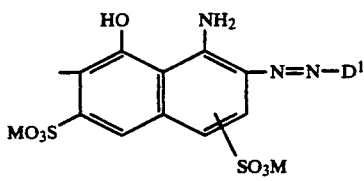

in which

R$^G$, P¹, P², m and M have the abovementioned meanings,

P⁴ is phenylureido which is substituted in the phenyl radical by chlorine, methyl, methoxy, sulfo and/or carboxy and by a group —SO₂—Y where Y has the above meaning, or is benzoylamino which is substituted in the benzene radical by chlorine, methyl, methoxy, nitro, sulfo and/or carboxy and by a group —SO₂—Y where Y has the above meaning, P⁵ is hydrogen, alkyl of 1 to 4 carbon atoms, such as methyl and ethyl, alkoxy of 1 to 4 carbon atoms, such as methoxy and ethoxy, or is bromine, chlorine or alkanoylamino of 2 to 7 carbon atoms, such as acetylamino and propionylamino, P⁶ is hydrogen, alkyl of 1 to 4 carbon atoms, such as methyl and ethyl, alkoxy of 1 to 4 carbon atoms, such as methoxy and ethoxy, or is chlorine or alkanoylamino of 2 to 7 carbon atoms, such as acetylamino and propionylamino, or is ureido or phenylureido, P⁷ is hydrogen or alkyl of 1 to 4 carbon atoms, which can be substituted by hydroxy, cyano, carboxyl, sulfo, sulfato, methoxycarbonyl, ethoxycarbonyl or acetoxy or a group —SO₂—Y of the above definition, P⁸ is alkyl of 1 to 4 carbon atoms, which can be substituted by hydroxy, cyano, carboxy, sulfo, sulfato, methoxycarbonyl, ethoxycarbonyl or acetoxy and is substituted by a group —SO₂—Y of the above definition, or is benzyl or phenyl which is substituted by alkyl of 1 to 4 carbon atoms, alkoxy of 1 to 4 carbon atoms, chlorine and/or sulfo, the phenyl radical being substituted in each case by a group —SO₂—Y of the above definition, P⁹ is hydrogen, alkyl of 1 to 4 carbon atoms, such as methyl, cyano, carboxy, carbalkoxy of 2 to 5 carbon atoms, such as carbomethoxy and carbethoxy, or is carbamoyl or phenyl, preferably methyl, carboxy, methoxycarbonyl, ethoxycarbonyl or phenyl and in particular methyl or carboxy, T is a benzene or naphthalene ring, preferably a benzene ring, P¹⁰ is hydrogen or alkyl of 1 to 4 carbon atoms, such as methyl, or alkyl of 1 to 4 carbon atoms which is substituted by alkoxy of 1 to 4 carbon atoms, such as methoxy, or by cyano, preferably alkyl of 1 to 4 carbon atoms or phenyl, P¹¹ is hydrogen, chlorine, bromine, sulfo, carbamoyl, methylsulfonyl, phenylsulfonyl, cyano or sulfoalkyl of 1 to 4 carbon atoms, preferably hydrogen, sulfo, sulfoalkyl having an alkyl radical of 1 to 4 carbon atoms, such as sulfomethyl, or is cyano or carbamoyl, B is alkylene of 1 to 4 carbon atoms, methylenephenylene, ethylenephenylene, phenylenemethylene, phenyleneethylene or phenylene or methylenephenylene, ethylenephenylene or phenylene each of which is substituted in the benzene radical by fluorine, chlorine, bromine, methyl, methoxy, cyano, sulfo, carboxy, acetyl, nitro, carbamoyl and/or sulfamoyl, and $D^1$ is a radical of the formula (5a) or (5b).

Examples of radicals —K—Z of coupling components of the formula H—K—Z or H—K—N($R^x$)H are radicals of the formulae (9a) to (9h)

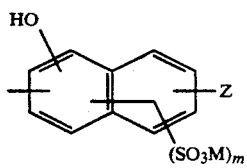 (9a)

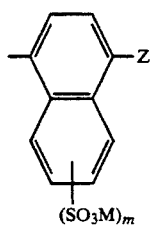 (9b)

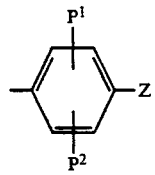 (9c)

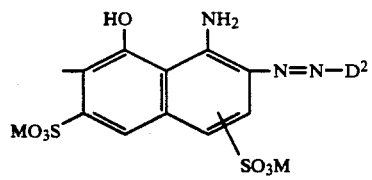 (9d)

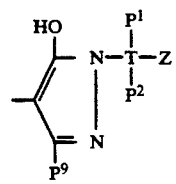 (9e)

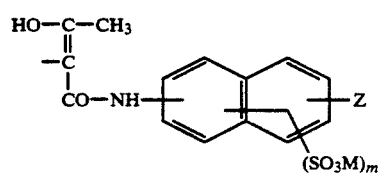 (9f)

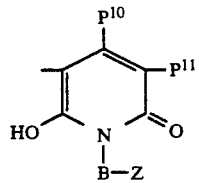 (9g)

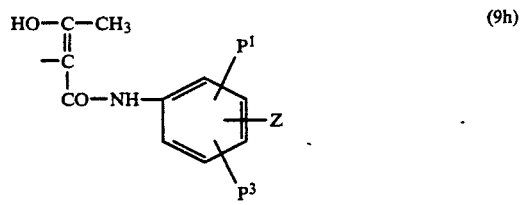 (9h)

in which

R, $P^1$, $P^2$, $P^9$, $P^{10}$, $P^{11}$, B, T, M, m and Z have the abovementioned, in particular preferred, meanings, and $D^2$ as radical of a diazo component is a radical of the abovementioned and defined formula (6a) or (6b).

In the above formulae (8a), (8b) and 9a), the free bond leading to the azo group is bound to the aromatic ring in the ortho position relative to the hydroxy group.

Radicals K and $K^1$ in the formulae (4g) and (4h) containing an oxygen atom bound in the form of a metal complex and containing the group Z are in particular those of the formulae (10a) to (10e)

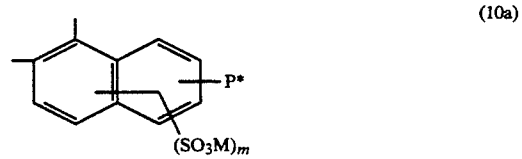 (10a)

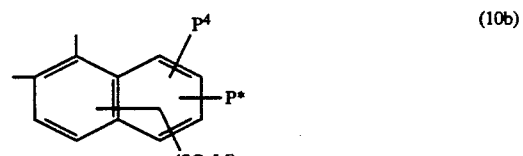 (10b)

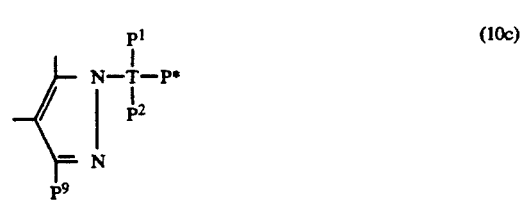 (10c)

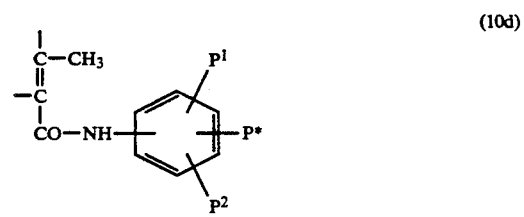 (10d)

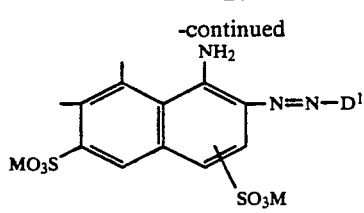

(10e)

in which the individual formula members have one of the above mentioned meanings and P* is either a radical Z or a grouping of the formula —N=N—K—Z.

Examples of groups of the formula (5a) and (5b) are: 2-(β-sulfatoethylsulfonyl)phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-3-(sulfatoethylsulfonyl)phenyl, 2-chloro-4-(β-sulfatoethylsulfonyl)phenyl, 2-ethoxy-4- or -5-(β-sulfatoethylsulfonyl)phenyl, 2-ethyl-4-(β-sulfatoethylsulfonyl)-phenyl, 2-methoxy-5- or -4-(β-sulfatoethylsulfonyl)-phenyl, 2,4-diethoxy-5-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2- or 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2-sulfo-4-vinylsulfonylphenyl, 2-hydroxy-4- or -5-(β-sulfatoethylsulfonyl)phenyl, 2-chloro-4- or -5-(β-chloroethylsulfonyl)phenyl, 2-hydroxy-3-sulfo-5-(β-sulfatoethylsulfonyl)phenyl, 3- or 4-(β-acetoxyethylsulfonyl)phenyl, 5-(β-sulfatoethylsulfonyl)naphth-2-yl, 6- or 7- or 8-(β-sulfatoethylsulfonyl)-naphth-2-yl, 6-(β-sulfatoethylsulfonyl)-1-sulfonaphth-2yl, 5-(β-sulfatoethylsulfonyl)-1-sulfonaphth-2-yl, 8-(β-sulfatoethylsulfonyl)-6-sulfonaphth-2-yl, 3- or 4-{β-[4-(β′-sulfatoethylsulfonyl)phen]ethylamino}phenyl, 3- or 4-{β-[2-sulfo-4-(β′-sulfatoethylsulfonyl)phen]ethylamino}phenyl, 3-or 4-[β-(β′-chloroethylsulfonyl)ethylamino]phenyl, 3-or 4-]β-(β′-sulfatoethylsulfonyl)ethylamino]phenyl, 3- or 4-[β-(vinylsulfonyl)ethylamino]phenyl, 3- or 4-[γ-(β′-chloroethylsulfonyl)propylamino]phenyl, 3- or 4-]γ(β′-sulfatoethylsulfonyl)propylamino]phenyl, 3- or 4-[γ-(vinylsulfonyl)propylamino]phenyl, 3,4-di-(β-sulfatoethylsulfonyl)phenyl, 2,5-di-(β-sulfatoethylsulfonyl)phenyl, 4-[γ-(β′-sulfatoethylsulfonyl)propoxy]phenyl, 2,5-bis[(β-sulfatoethylsulfonyl)methyl]phenyl, 3- or 4-{N-[γ-(β′-sulfatoethylsulfonyl)propyl]aminocarbonyl}phenyl, 3,5-bis{N-[γ-(β′-sulfatoethylsulfonyl)propyl]aminocarbonyl}-phenyl, 3-sulfo-4-55 N-[γ-β′-sulfatoethylsulfonyl)-propyl]-aminocarbonylmethoxy}phenyl and 4-{N-[γ-(β′-sulfatoethylsulfonyl)propyl]aminocarbonylmethoxy}phenyl.

Of the phthalocyanine dyes according to the invention, those are preferred which have the formula (11)

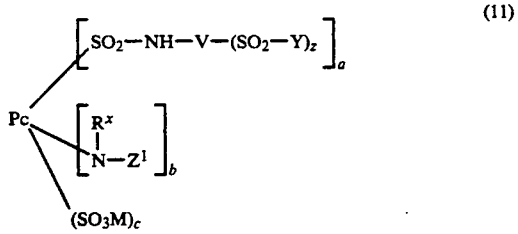

in which
Pc is a copper phthalocyanine or nickel phthalocyanine radical,
$Z^1$ is a group of the formula (3A) or, preferably, (3b) or (3C)

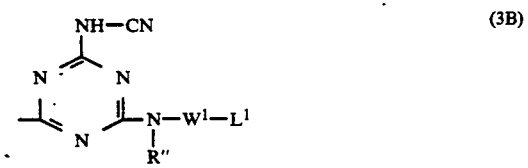

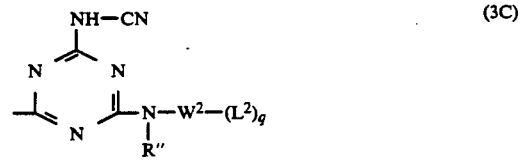

in which Q, R″, $W^1$, $W^2$, $L^1$, $L^2$ and q have the abovementioned, in particular preferred, meanings,
a is a number from 1 to 3,
b is a number from 1 to 2, and
c is a number from 0 to 2, the sum of (a+b+c) being at most 4 and the sum of (a+b) being a number from 2 to 4, and
V, Y, $R^x$, M and z have one of the abovementioned, in particular preferred, meanings.

Of the azo dyes, those are furthermore preferred which have the formulae (12A) to (12V)

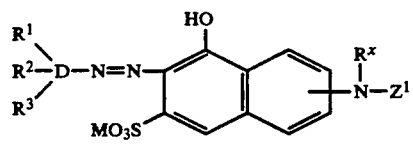

(12A)

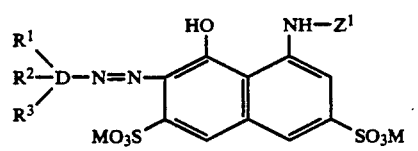

(12B)

-continued
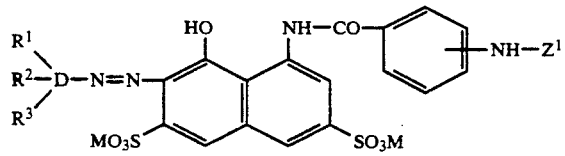
(12C)
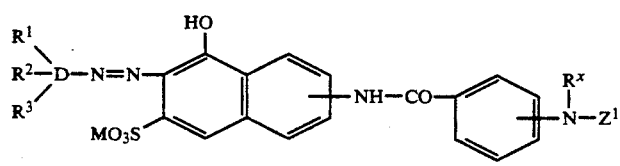
(12D)
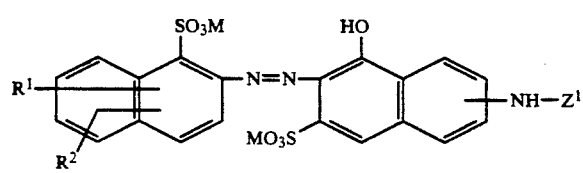
(12E)
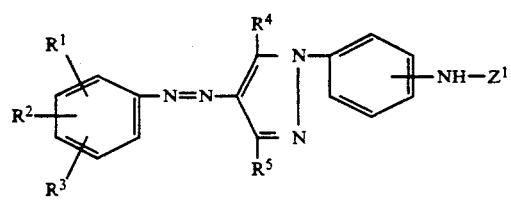
(12F)
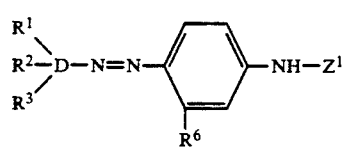
(12G)
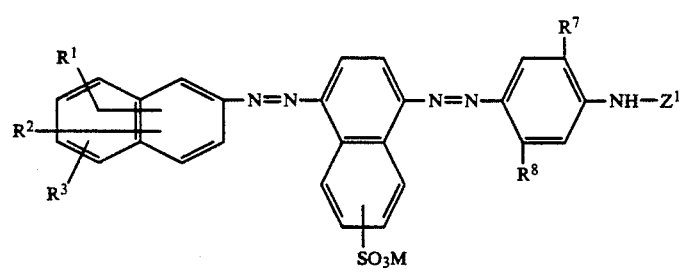
(12H)
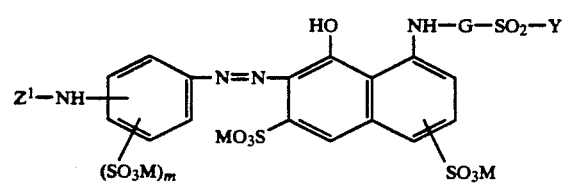
(12J)
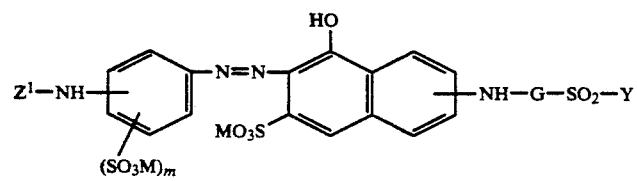
(12K)

-continued
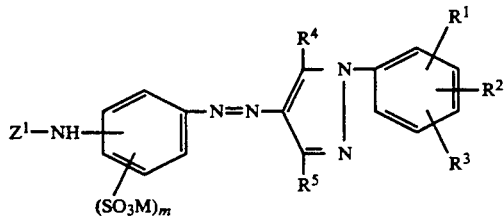
(12L)
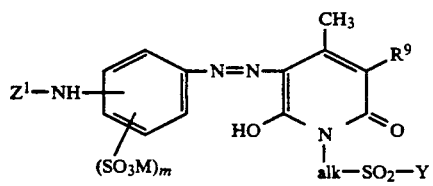
(12M)
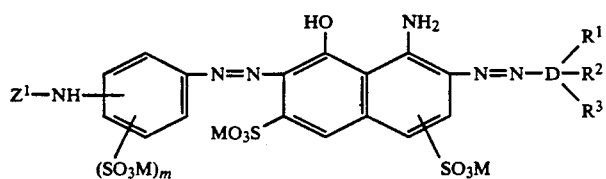
(12N)
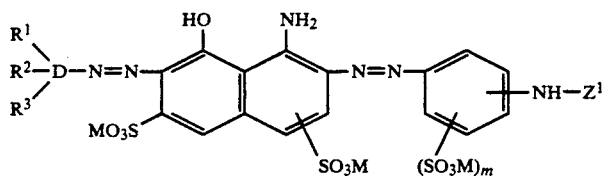
(12P)
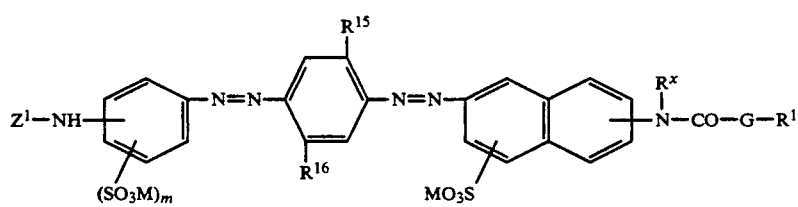
(12Q)
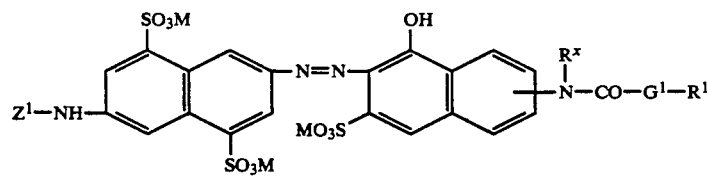
(12R)
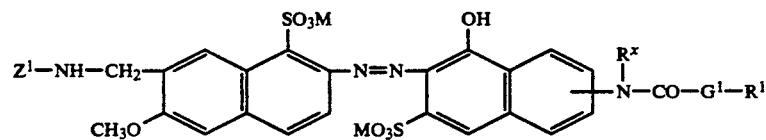
(12S)
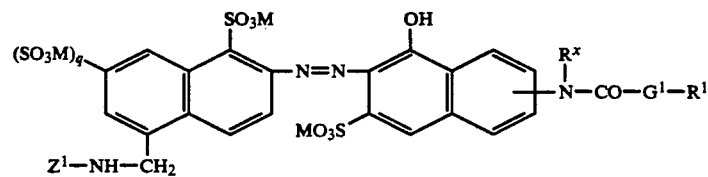
(12T)

-continued

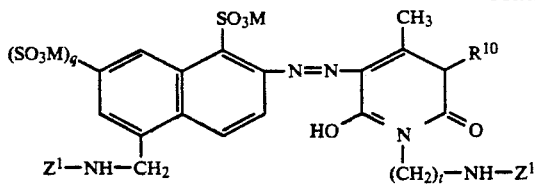
(12U)

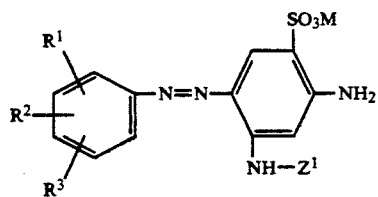
(12V)

in which:
Z¹ is a radical of the formula (3A), (3B), or (3C);
M has one of the abovementioned meanings;
$R^x$ is hydrogen or alkyl of 1 to 4 carbon atoms, such as methyl or ethyl;
D is a benzene ring or is a naphthalene ring, the azo group being preferably bound to the naphthalene ring in the β-position and, in the case where D is a naphthalene ring, each $R^2$ and $R^3$, independently of the other, being preferably a hydrogen atom or a sulfo group;
R¹ is β-sulfatoethylsulfonyl, β-chloroethylsulfonyl or vinylsulfonyl;
R² is hydrogen, alkyl of 1 to 4 carbon atoms, such as ethyl and, in particular, methyl, alkoxy of 1 to 4 carbon atoms, such as ethoxy and, in particular, methoxy, halogen, such as chlorine and bromine, carboxy, sulfo, or a group of the formula —SO₂—Y where Y has the abovementioned meaning, such as β-sulfatoethylsulfonyl, β-chloroethylsulfonyl or vinylsulfonyl and is preferably hydrogen;
R³ is hydrogen, alkyl of 1 to 4 carbon atoms, such as ethyl and, in particular, methyl, alkoxy of 1 to 4 carbon atoms, such as ethoxy and, in particular, methoxy, halogen, such as chlorine and bromine, carboxy or sulfo, preferably hydroxy;
R⁴ is hydroxy or amino, preferably hydroxy;
R⁵ is methyl, carboxy, carbomethoxy or carbethoxy, preferably methyl or carboxy;
R⁶ is acetylamino, ureido or methyl;
R⁷ is hydrogen, alkyl of 1 to 4 carbon atoms, such as methyl and ethyl, alkoxy of 1 to 4 carbon atoms, such as methoxy and ethoxy, halogen, such as bromine and, in particular, chlorine, preferably hydrogen, methyl, ethyl, methoxy, ethoxy or chlorine;
R⁸ is hydrogen or alkyl of 1 to 4 carbon atoms, such as methyl and ethyl, alkanoylamino of 2 to 5 carbon atoms, such as acetylamino and propionylamino, or is ureido, preferably hydrogen, methyl, ethyl, methoxy, ethoxy, acetylamino or ureido;
R⁹ is hydrogen, cyano, carbamoyl, sulfamoyl or sulfomethyl, preferably hydrogen or carbamoyl;
R¹⁰ is cyano, carbamoyl or sulfomethyl;
alk is alkylene of 2 to 4 carbon atoms, -preferably ethylene;
G is alkylene of 2 to 4 carbon atoms, preferably n-ethylene or, in particular, n-propylene, or is carbonylphenylene;
G¹ is phenylene or is a radical of the formula —NH—(CH₂)₃—;
m is the number zero, 1 or 2 (this group being hydrogen in the case where m is zero);
q is the number zero or 1 (this group being hydrogen in the case where q is zero);
t is the number 2 or 3; in the compounds of the formulae (12A), (12D), (12E), (12K) and (12Q) to (12T), the amino grouping containing the fiber-reactive radical is bound to the 8-naphthol radical in the 2- or 3-position.

The present invention furthermore relates to processes for the preparation of the dyes according to the invention of the formula (1). They can be prepared in a customary manner known per se analogously to known synthetic routes specific for the particular class of dyes by reacting precursors typical of the particular dye, at least one of which contains a group of the formula (3) and at least one of which contains a group of the formula (5), with one another, or by starting with an amino-containing starting compound of the formula (55)

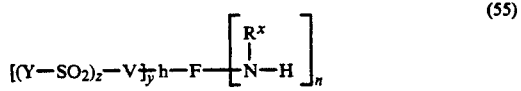
(55)

in which F, $R^x$ and n have the abovementioned meanings, and reacting it with a trihalo-s-triazine of the formula (56)

(56)

in which Hal is a halogen atom, such as, in particular, a chlorine or fluorine atom, with cyanamide or an alkali metal salt thereof and with an amine of the formula H-Q where Q has the abovementioned meaning in stoichiometric amounts in any desired order, and then carrying out, if desired, further necessary conversion reactions known to one skilled in the art.

The dyes according to the invention can in particular be prepared according to the invention by reacting a compound of the formula (57)

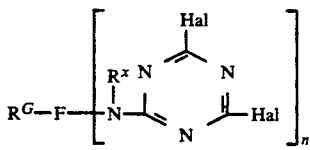

(57)

in which $R^G$, F, $R^x$ and n have the abovementioned meanings and Hal is a halogen atom, such as, in particular, a chlorine or fluorine atom, with cyanamide or an alkali metal salt thereof, and reacting the compound thus obtained of the formula (58)

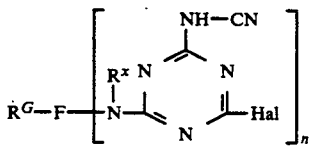

(58)

in which $R^G$, F, $R^x$ and Hal have the abovementioned meanings, with an amine of the formula H-Q where Q has the abovementioned meaning, or by reacting a compound of the formula (59)

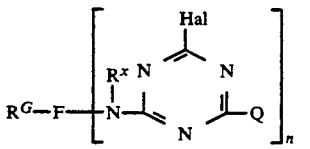

(59)

in which $R^G$, F, $R^x$, Hal, Q and n have the abovementioned meanings, with cyanamide or an alkali metal salt thereof, or by reacting a compound of the formula (55) with a compound of the formula (60)

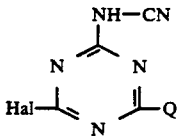

(60)

where Hal and Q have the abovementioned meaning.

The reactions of the starting compounds are carried out in aqueous or aqueous-organic medium in suspension or solution. If the reactions are carried out in an aqueousorganic medium, the organic medium is, for example, acetone, dimethylformamide and N-methylpyrrolidone. Advantageously, the hydrogen halide released during the condensation is continuously neutralized by addition of aqueous alkali metal hydroxides, alkali metal carbonates or alkali metal bicarbonates.

The reaction of the starting compounds of the formula (58) with the amine of the formula H—Q is carried out at a temperature of between 30° and 100° C., preferably between 65° and 85° C., and at a pH of between 3 and 11.5, preferably between 3.5 and 7, and the reaction of the compound of the formula (55) with the compound of the formula (60) is preferably carried out at a temperature of between 25° and 90° C., in -particular between 45° and 75° C., and at a pH of between 3 and 11.5, in particular between 3.5 and 6.5.

Apart from the reaction of a compound of the formula (57) with cyanamide, compounds of the formula (58) can also be prepared by reacting, analogously to known procedures, a suitable 2,4-dihalo-6-cyanamido-s-triazine with a starting compound of the formula (55), or, likewise analogously to known procedures, by reaction of a dye precursor customary for the type of dye but containing a group of the formula (61)

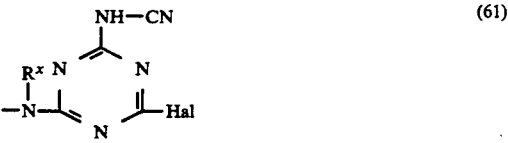

(61)

in which $R^x$ and Hal have the abovementioned meanings, with a further precursor containing a group of the formula (5).

As a rule, the amine of the formula H—Q is used in the reactions in the form of a salt, such as a sulfate or, preferably, in the form of hydrochloride.

If the starting compounds in the synthesis according to the invention of the azo dyes are diazo and coupling components containing the group of the formulae (3) and (5), the reactions are carried out by the customary procedure of diazotization and coupling reactions, for example the diazotization, as a rule, at a temperature of between −5° C. and +15° C. and a pH below 2 by means of a strong acid and alkali metal nitrite in, preferably, an aqueous medium, and the coupling reaction, as a rule, at a pH of between 1.5 and 4.5 in the case of an amino-containing coupling component and at a pH of between 3 and 7.5 in the case of a hydroxyl-containing coupling component and at a temperature of between 0° and 25° C., likewise preferably in aqueous medium.

In the synthesis according to the invention of heavy metal complex azo dyes, for example those of the formula (4h), the starting compounds are, as a rule, those azo compounds which are free of heavy metals and contain, in the coupling component, a phenolic or naphtholic hydroxyl group bound in the ortho position or vicinal position relative to the azo group and whose diazo component radical contains a hydrogen atom or a hydroxyl group or a lower alkoxy group, such as a methoxy group, bound in the ortho position relative to the azo group, it being possible for the starting azo compounds which are free of heavy metal to additionally contain a bound acylamino radical, such as an acetylamino radical.

For example, the synthesis of the copper complex azo dyes of the formula (4h) can be started with a starting compound of the formula (62)

$$R^G-D_1-\underset{\underset{R^k}{|}}{N}=N-\underset{\underset{HO}{|}}{K^1}-(N=N-K)_v-\text{acylamino}$$

(62)

in which $D_1$, K, $K^1$ and v have one of the abovementioned meanings and $R^k$s a hydrogen atom or a hydroxy or methoxy group bound to $D_1$ in the ortho position relative to the azo group, and this acylamino-containing starting azo compound can be reacted, analogously to known and customary procedures, with a copper-donating agent, such as a copper salt. If $R^k$ is a hydrogen atom or a methoxy group, the compound (62) can be subjected to an oxidative or dealkylating copperization reaction to be carried out in the usual manner. The copper complex azo compound now obtained which contains the acylamino group can then be reacted, analogously to known procedures, after or with hydrolysis of the acylamino group to the amino group using a cyanuric halide or a compound of the formula (60), to give the dye according to the invention of the formula (1).

Examples of starting compounds which contain a fiber-reactive grouping $R^G$ and can serve as diazo components are: 2-($\beta$-sulfatoethylsulfonyl)aniline, 3-($\beta$-sulfatoethylsulfonyl)aniline, 4-($\beta$-sulfatoethylsulfonyl)aniline, 2-carboxy-5-($\beta$-sulfatoethylsulfonyl)aniline, 2-chloro-3-(sulfatoethylsulfonyl)aniline, 2-chloro-4-($\beta$-sulfatoethylsulfonyl)aniline, 2-ethoxy-4- or -5-($\beta$-sulfatoethylsulfonyl)aniline, 2-ethyl-4-($\beta$-sulfatoethylsulfonyl)aniline, 2-methoxy-5- or -4-($\beta$-sulfatoethylsulfonyl)aniline, 2,4-diethoxy-5-($\beta$-sulfatoethylsulfonyl)aniline, 2,4-dimethoxy-5-($\beta$-sulfatoethylsulfonyl)aniline, 2,5-dimethoxy-4-($\beta$-sulfatoethylsulfonyl)aniline, 2-methoxy-5-methyl-4-($\beta$-sulfatoethylsulfonyl)aniline, 2- or 3- or 4-($\beta$-thiosulfatoethylsulfonyl)aniline, 2-methoxy-5-($\beta$-thiosulfatoethylsulfonyl)aniline, 2-sulfo-4-($\beta$-phosphatoethylsulfonyl)aniline, 2-sulfo-4-vinylsulfonylaniline, 2-hydroxy-4- or -5-($\beta$-sulfatoethylsulfonyl)aniline, 2-chloro-4- or -5-($\beta$-chloroethylsulfonyl)aniline, 2-hydroxy-3-sulfo-5-($\beta$-sulfatoethylsulfonyl)aniline, 3- or 4-($\beta$-acetoxyethylsulfonyl)aniline, 5-($\beta$-sulfatoethylsulfonyl)-2-aminonaphthalene, 6- or 7- or 8-($\beta$-sulfatoethylsulfonyl-2-aminonaphthalene, 6-($\beta$-sulfatoethylsulfonyl)-1-sulfo-2-aminonaphthalene, 5-($\beta$-sulfatoethylsulfonyl)-1-sulfo-2-aminonaphthalene, 8-($\beta$-sulfatoethylsulfonyl)-6-sulfo-2-aminonaphthalene, 3- or 4-{$\beta$-[4-($\beta'$-sulfatoethylsulfonyl)phen]ethylamino}aniline, 3- or 4-{$\beta$-[2-sulfo-4-($\beta'$-sulfatoethylsulfonyl)phen]ethylamino}-aniline, 3- or 4-[$\beta$-($\beta'$-chloroethylsulfonyl)ethylamino]-aniline, 3- or 4-[$\beta$-($\beta'$-sulfatoethylsulfonyl)ethylamino]-aniline, 3- or 4-[$\beta$-(vinylsulfonyl)ethylamino]aniline, 3- or 4[$\gamma$-($\beta$-chloroethylsulfonyl)propylamino]aniline, 3- or 4-[$\gamma$-($\beta'$-sulfatoethylsulfonyl)propylamino]aniline, 3or 4-[$\gamma$-(vinylsulfonyl)propylamino]aniline, 3,4-di-($\beta$-sulfatoethylsulfonyl)aniline, 2,5-di-($\beta$-sulfatoethylsulfonyl)aniline, 4-[$\gamma$-($\beta'$-sulfatoethylsulfonyl)propoxy]-aniline, 2,5-bis-[($\beta$-sulfatoethylsulfonyl)methyl]aniline, 3- or 4-{N-[$\gamma$($\beta'$-sulfatoethylsulfonyl)propyl]aminocarbonyl}aniline, 3,5-bis-{[$\beta'$-sulfatoethylsulfonyl)propyl]aminocarbonyl}aniline, 3-sulfo-4-{N-[$\gamma$-($\beta'$-sulfatoethylsulfonyl)propyl]aminocarbonylmethoxy}-aniline and 4-{N-[$\gamma$-($\beta'$-sulfatoethylsulfonyl)propyl]-aminocarbonylmethoxy}aniline.

Examples of starting compounds of the formula $H_2N-D-NH_2$ and $H_2N-D_1-NH_2$ are 1,4-phenylenediamine, 2-sulfo-1,4-phenylenediamine, 2-carboxy-1,4-phenylenediamine, 1,4-diamino-2-sulfonaphthalene, 2,6-diamino-8-sulfonaphthalene, 2,6-diamino-4,8-disulfonaphthalene, 1,3-phenylenediamine, 4-sulfo-1,3-phenylenediamine, 4,6-disulfo-1,3-phenylenediamine, 2,6-disulfo-1,4-phenylenediamine, 2,5-disulfo-1,4-phenylenediamine, 1,4-diamino-6-sulfonaphthalene, 4,4'-diamino-3-sulfodiphenyl and 4,4'-diaminostilbene-2,2'-disulfonic acid.

Examples of starting compounds of the formula H—E—NH$_2$ which can be used for the synthesis of the disazo dyes according to the invention and serve as coupling component and, after the coupling, as diazo component are aniline, 3-methylaniline, 2,5-dimethylaniline, 2,5-dimethoxyaniline, 3-methoxyaniline, 3-acetylaminoaniline, 3-propionylaminoaniline, 3-butyrylaminoaniline, 3-benzoylaminoaniline, 3-ureidoaniline, 2-methyl-5-acetylaminoaniline, 2-methoxy-5-acetylaminoaniline, 2-methoxy-5-methylaniline, 1-aminonaphthalene-6-sulfonic acid, 1-aminonaphthalene-7-sulfonic acid, 2-sulfo-5-acetylaminoaniline, 2-amino-5-naphthol-7-sulfonic acid, 2-amino-8-naphthol-6-sulfonic acid, 2-(4'-aminobenzoylamino)-5-naphthol-7-sulfonic acid, 1-(4'-amino-2'-sulfophenyl)-3-methyl- or -3-carboxy-5-pyrazolone and 3-sulfo-4-amino-N-(acetoacetyl)anilide.

Examples of starting compounds which can serve as coupling components of the formula H—K—$R^G$ for the synthesis of the azo dyes according to the invention are 1-[4'-($\beta$-sulfatoethylsulfonyl)phenyl]-3-methyl-5-pyrazolone, 1-[4'-(vinylsulfonyl)phenyl]-3-methyl-5-pyrazolone, 1-[4'-($\beta$-sulfatoethylsulfonyl)phenyl]-3-carboxy-5-pyrazolone, 1-[3'-($\beta$-chloroethylsulfonyl)benzoylamine]-3,6-disulfo-8-naphthol, 1-[3'-(vinylsulfonyl)benzoylamino]-3,6-disulfo-8-naphthol, 1-[3'-(vinylsulfonyl)benzoylamino]-4,6-disulfo-8-naphthol, 1-[3'-($\beta$-sulfatoethylsulfonyl) benzoylamino9 -4,6-disulfo-8-naphthol, 2-[3'-($\beta$-chloroethylsulfonyl)benzoylamino]-6-sulfo-8-naphthol, 2-[3'-(vinylsulfonyl)benzoylamino]-6-sulfo-8-naphthol, 3-[3'-($\beta$-chloroethylsulfonyl)benzoylamino]-6-sulfo-8-naphthol, 3- 3'-(vinylsulfonyl)benzoylamino]-6-sulfo-8-naphthol, 6-sulfo-1-[3'-($\beta$-chloroethylsulfonyl)benzoylamino]benzoylamino]naphthol, 7-sulfo-[3'-(vinylsulfonyl)benzoylamino]naphthol, 2-[N-methyl-N-($\beta$-sulfatoethylsulfonyl)amino]-6-sulfo-8-naphthol, 3-[N-methyl-N-($\beta$-sulfatoethylsulfonyl)amino]-6-sulfo-8-naphthol, 2-[N-ethyl-N-($\beta$-sulfatoethylsulfonyl)amino]-6-sulfo-8-naphthol, 1-[N'-(3'-$\beta$-chloroethylsulfonylphenyl)ureido]-3,6-disulfo-8-naphthol, 1-[N'-(3'-vinylsulfonylphenyl)ureido]-3,6-disulfo-8-naphthol, 1[N'-(3'-vinylsulfonylpropyl)ureido]-4,6-disulfo-3,6-disulfo-8-naphthol, 1-[N'-(3'-$\beta$-chloroethylsulfonylphenyl)ureido]-4,6-disulfo-8-naphthol, 1-[N'-(3'-vinylsulfonylphenyl)ureido]-4,6-disulfo-8-naphthol, 1-[N'-(3'-$\beta$-chloroethylsulfonylpropyl)ureido]-4,6-disulfo-8-naphthol, 2-[N'-(3'-$\beta$-sulfatoethylsulfonylphenyl)ureido]-6-sulfo-8-naphthol, 2-[N'-(3'-chloroethylsulfonylpropyl)ureido]-6-sulfo-8-naphthol, 3-[N'-(3'-$\beta$-chloroethylsulfonylphenyl)ureido]-6-sulfo-8-naphthol, 3-[N'-(3'-vinylsulfonylpropyl)ureido]-6-sulfo-8-naphthol, 2-sulfo-5-[N'-(3''-$\beta$-chloroethylsulfonyl)phenyl]ureidoaniline, 3-[N'-(3''-$\beta$-sulfatoethylsulfonyl)phenyl]ureidoaniline and 6-sulfo-1-[N'-(3'''-$\beta$-sulfatoethylsulfonyl)phenyl]ureido-8-naphthol.

Examples of coupling components of the formula H—K—N($R^x$)H which can serve for the synthesis of the azo dyes according to the invention and in which the fiber-reactive radical Z is present in the coupling component, the fiber-reactive radical $Z^1$ or another previously mentioned halotriazine radical being, if desired, introduced afterwards into the amino group —N($R^x$)H of the initially obtained amino-containing azo dye of the formula (55), are aniline, 3-methylaniline, 2,5-dimethylaniline, 2,5-dimethoxyaniline, 3-methoxyaniline, 3-acetylaminoananiline, 3-propionylaminoaniline, 3-butyrylaminoaniline, 3-benzoylaminoaniline, 3-(hydroxyacetylamnio)aniline, 3-ureidoaniline, 2-methyl-5-acetylaminoaniline, 2-methoxy-5-acetylaminoaniline, 2-methoxy-5-methylaniline, 1-aminonaphthalene-6-sulfonic acid, 1-aminonaphthalene-7-sulfonic acid, 4-sulfo-1,3-diaminobenzene, 6-sulfo-2-methoxy-1-aminonaphthalene, 5,7-disulfo-2-aminonaphthalene, 1-amino-8-hydroxynaphthalene-4-sulfonic acid, 1-amino-8-hydroxy-naphthalene-6-sulfonic acid, 1-amino-8-hydroxynaphthalene-2,4-disulfonic acid, 1-amino-8-naphthol-3,6-disulfonic acid, 1-amino-8-hydroxy-4,6- disulfonic acid, 1-amino-8-hydroxy-naphthalene-2,4,6-trisulfonic acid, 2-(methylamino)- and 2-(ethylamino)-5-hydroxynaphthalene-7-sulfonic acid, 2-amino-5-hydroxynaphthalene-1,7-disulfonic acid, 2-(methylamino)- and 2-(ethylamino)-8-hydroxynaphthalene-6-sulfonic acid, 2-amino-8-hydroxynaphthalene-3,6-disulfonic acid, 2-(4'-amino-3'-sulfophenylamino)-5-hydroxynaphthalene-7-sulfonic acid, 1-amino-8-hydroxy-2-(phenylazo)-naphthalene-3,6-disulfonic acid, 1-amino-8-hydroxy-2-(4'-sulfophenylazo)naphthalene-3,6-disulfonic acid, 1-amino-8-hydroxy-2-(2',5'-disulfophenylazo)naphthalene-3,6-disulfonic acid, 1-($\beta$-aminoethyl)-3-cyano-4-methyl-6-hydroxy-2-pyridone, 1-($\gamma$-aminopropyl)-3-sulfomethyl-4-methyl-6-hydroxy-2-pyridone, 1,3-diaminobenzene, 3-[N,N-di-($\beta$-hydroxyethyl)]aminoaniline, 3-[N,N-di-($\beta$-sulfatoethyl)]amino-4-methoxyaniline, 3-(sulfobenzylamino)-aniline, 3-sulfobenzoylamino)-4-chloroaniline and 3-[N,N-di-(sulfobenzyl)]aminoaniline, 2-sulfo-5-acetylaminoaniline, 2-amino-5-naphthol-7-sulfonic acid, 2-amino-8-naphthol-6-sulfonic acid, 1-(4'-aminobenzoyl)amino-8-hydroxynaphthaline-3,6-disulfonic acid, 1-(4'-aminobenzoyl)amino-8-hydroxynaphthalene-4,6-disulfonic acid, 1-(3'-aminobenzoyl)amino-8-hydroxynaphthalene-3,6-disulfonic acid, 1-(3'-aminobenzoyl)amino-8-hydroxynaphthalene-4,6-disulfonic acid, 1-(2'-aminobenzoyl)amino-8-hydroxynaphthalene-3,6-disulfonic acid, 1-(2'-aminobenzoyl)amino-8-hydroxynaphthalene-4,6-disulfonic acid, 2-(3'-aminobenzoyl)amino-5-hydroxynaphthalene-7-sulfonic acid, 2-(2'-aminobenzoyl)amino-5-hydroxynaphthalene-7-sulfonic acid, 2-(4'-aminobenzoyl)amino-8-hydroxynaphthalene-6-sulfonic acid, 2-(3'-aminobenzoyl)amino-8-hydroxynaphthalene-6-sulfonic acid, 2-(2'-aminobenzoyl)-amino-8-hydroxynaphthalene-6-sulfonic acid, 2-(4'-aminobenzoyl)amino-5-naphthol-7-sulfonic acid, 1-(4'-amino- or 1-(4'-acetylamino-2-sulfophenyl)-3-methyl-or-3-carboxy-5-pyrazolone, 3-sulfo-4-amino-N-(acetoacetyl)anilide, 1-amino-8-naphthol-3,6- or 4,6-disulfonic acid, 1-(3'-aminobenzoyl)- or 1-(4'-aminobenzoyl)amino-8-naphthol-3,6- or -4,6-disulfonic acid, 1-acetylamino-8-naphthol3,6- or -4,6-disulfonic acid, 2-acetylamino-5-naphthol7-sulfonic acid, 2-acetyl-amino-8-naphthol-6-sulfonic acid, 3-acetylamino-8-naphthol-6-sulfonic acid, 3-(N-methylamino)-8-naphthol-6-sulfonic acid, 1-(3'-amino- or 1-(3'-acetylamino-6'-sulfophenyl)-3-methyl- or -3-carboxy-5-pyrazolone, 2-(N-methyl-N-acetylamino)- or 2-methylamino-5-naphthol-7-sulfonicacid, N-methylaniline and N-propyl-m-toluidine.

If the starting compounds are diazo components of the formula $H_2N-D-NH_2$ or $H_2N-D_1-NH_2$, they can also be used in the form of the monoacylaminoamino compounds, the acyl radical being in particular an acetyl radical. These monoacylaminoamino compounds are first diazotized and coupled onto a couplable compound; the acyl radical is then cleaved off hydrolytically, and the amino group now set free again in this manner can be linked to the fiber-reactive radical $Z^1$. Examples of such monoacylated diamines are 2-sulfo-5-acetylaminoaniline and 2-sulfo-4-acetylaminoaniline. Similarly, amino-containing coupling components can be used in the coupling reaction in the form of the acylamino derivative, which, here too, can be followed by cleaving of the acyl radical hydrolytically, in order to link the liberated amino group to the fiber-reactive group $Z^1$. Bivalent coupling components which can serve for the synthesis of disazo dyes according to the invention and in which the bivalent coupling radical is linked to two diazo components, one of which contains a fiber-reactive radical $R^G$ and the other a fiber-reactive radical Z, for example of dyes of the formulae (4c) and (4d) are, for example, resorcinol, 1,3-diaminobenzene, 5,5,-dihydroxy-7,7'-disulfo-2,2'-dinaphthylurea, 1,8-dihydroxy-3,6-disulfonaphthalene and, in particular, 1-amino-8-naphthol-3,6-disulfonic acid and 1-amino-8-naphthol-4,6-disulfonic acid.

The phthalocyanine dyes according to the invention can be prepared by starting with a sulfo-containing or sulfo-free phthalocyaninesulfonyl chloride and reacting it in any desired order with amino compounds, one amino compound containing a fiber-reactive radical $R^G$ and the other amino compound having either the fiber-reactive radical Z or being a diamino compound, of which that amino group which has not reacted with the phthalocyaninesulfonyl chloride serves to introduce the fiber-reactive group $Z^1$. In addition to these two types of amino compounds, it is also possible to use those amino compounds which do not possess a fiber-reactive grouping, such as, for example, compounds of the formula H—Q where Q has the above meanings, in which case W does not necessarily have to contain the water-solubilizing substituent. During the reaction of the phthalocyaninesulfonyl chlorides with the amino compounds, which is preferably carried out in aqueous medium and at a temperature of between 20° and 45° C. and at a pH of between 5.5 and 7.5, a portion of the chlorosulfonyl groups can be converted into sulfo groups by hydrolysis. These conversion reactions are known in the literature, such as, for example, from U.S. Pat. No. 4,745,187. The synthesis according to the invention of the phthalocyanine dyes according to the invention can be carried out analogously to these reactions.

Thus, for example, the phthalocyanine dyes according to the invention of the formula (11) can be prepared by reacting a phthalocyaninesulfonyl chloride of the formula (63)

(63)

in which Pc has the abovementioned meaning, r is a number from 0 to 2, preferably zero, and s is a number from 1 to 4, the sum of (r+s) being at most 4, with an amino compound of the formula (64) and an amino compound of the formula (65)

$H_2N-D-V-(SO_2Y)_z$ (64)

$H-N(R^x)-Z^1$ (65)

in which V, Y, z, $R^x$ and $Z^1$ have the abovementioned meanings, under the abovementioned conditions. However, it is also possible to prepare the phthalocyanine dyes of the formula (11) by first reacting a compound of the formula (63) with an amino compound of the formula (64) and an amine of the formula $H_2NR^x$ and then introducing the fiber-reactive group $Z^1$ into the free amino group, for example either by reaction with a compound of the formula (60) or by reaction first with a cyanuric halide and then with cyanamide and the amine of the formula H—Q or by reaction of a dihalocyanamido-s-triazine, followed by reaction of the amine H—Q.

The dyes according to the invention of the formula (1) are suitable for the dyeing and printing of a wide range of materials, such as silk, leather, wool, polyamide fibers and polyurethanes, and in particular of cellulose-containing fiber materials of any type. Examples of such fiber materials are the natural cellulose fibers, such as cotton, linen and hemp, and cellulose itself and regenerated cellulose. The dyes of the formula (1) are also suitable for the dyeing or printing of hydroxy-containing fibers contained in blended fabrics, for example blends of cotton with polyester fibers or polyamide fibers.

The dyes according to the invention can be applied to the fiber material and fixed on the fiber in various ways, in particular in the form of aqueous dye solutions and printing pastes. They are not only suitable for the exhaust method but also for dyeing by the pad-dyeing method, in which the goods are impregnated with aqueous, salt-containing or salt-free dye solutions and the dye is fixed after an alkali treatment or in the presence of alkali, if appropriate with the application of heat. The dyes according to the invention are particularly suitable for the so-called cold pad-batch method, in which the dye together with the alkali is applied to the pad-mangle and then fixed by several hours of storage at room temperature. After fixing, the dyeings or prints are thoroughly rinsed with cold and hot water, if appropriate with the addition of an agent acting as a dispersant and promoting the diffusion of the non-fixed portions. These dyeing and printing processes have been described in large numbers in the general technical literature and also in the patent literature.

Accordingly, the present invention also relates to the use of the dyes according to the invention of the formula (1) for the dyeing (including printing) of these materials and to processes for the dyeing (and printing) of such materials in a manner customary per se, in which a dye of the formula (1) is used as the colorant, by applying the dye of the formula (1) in aqueous medium to the material and fixing it on the material by means of heat or by means of an alkaline compound or by means of both.

If anthraquinone dyes according to the invention have insufficient solubility in the alkaline dye liquor, this shortcoming can be remedied in the manner known from the literature by addition of dispersants or other noncolored compounds, for example a naphthalenesulfonic acid/formaldehyde condensation product or, in particular, anthraquinone-2-sulfonic acid.

The dyes of the formula (1) are distinguished by high reactivity, good fixation properties and very good build-up properties. Accordingly, they can be used in the exhaust dyeing method at low dyeing temperatures and require only short steaming times in the pad-steam method. The degrees of fixation are high, and the non-fixed portions can be easily washed off, the difference between degree of exhaustion and degree of fixation being remarkably small, i.e. the soaping loss is very low. The dyes of the formula (1) are also suitable especially for printing, in particular on cotton, but also for the printing of nitrogen-containing fibers, for example of wool or silk or of blended fabrics containing wool or silk. Furthermore, they are highly suitable for use in discharge printing and resist printing processes.

The dyeings and prints produced by means of the dyes according to the invention have, in particular on cellulose fiber materials, a high color strength and a high stability of the fiber-to-dye bond not only in the acidic but also in the alkaline region, furthermore good light fastness and very good wet fastness properties, such as wash, water, seawater, cross dyeing and perspiration fastnesses and good pleating fastness, hot press fastness and rub fastness.

The Examples which follow serve to illustrate the invention. Parts and percentages are by weight unless stated otherwise. Parts by weight relate to parts by volume as the kilogram relates to the liter.

The compounds described in these Examples by way of formulae are given in the form of the free acid; in general, they are prepared and isolated in the form of their alkali metal salts, such as lithium salts, sodium salts or potassium salts, and used for dyeing in the form of their salts. Likewise, the starting compounds and components given in the examples below, in particular the Table Examples in the form of the free acid can be used in the synthesis as such or in the form of their salts, preferably alkali metal salts.

The absorption maxima ($\lambda_{max}$) in the visible region given for the dyes according to the invention were determined using their alkali metal salts in aqueous solution. In the Table Examples, the $\lambda_{max}$ values are put in brackets next to the hue; the wavelengths are given in nm.

EXAMPLE 1

10.7 parts of cyanamide are added at 0° C. to a suspension of 46 parts of cyanuric chloride in 400 parts of water; the reaction is carried out at a pH of between 8 and 8.5. After one hour, the mixture is brought to a pH of 2 to 2.5, 73 parts of 1-amino-8-naphthol-3,6-disulfonic acid are added, the batch is heated to 35° C, and the second condensation reaction is carried out while maintaining a pH of 2 to 2.5. After about 4 hours, 44.5 parts of 3-sulfoaniline are added, the batch is heated to 80° C. while maintaining a pH of 2.5, and the reaction is completed over a period of one hour while maintaining these reaction conditions.

An aqueous diazonium salt suspension prepared in the usual manner and comprising 72.1 parts of 4-($\beta$-sulfatoethylsulfonyl)aniline is added to this solution of the coupling component, and the coupling reaction is carried out at a pH of 4 to 4.5 and a temperature of about 20° C.

After clarifying the synthesis solution, the azo dye according to the invention obtained is isolated in the usual manner in the form of its alkali metal salt (sodium salt), for example by salting out with sodium chloride, by evaporation under reduced pressure or by spray-drying. Written in the form of the free acid, it has the formula

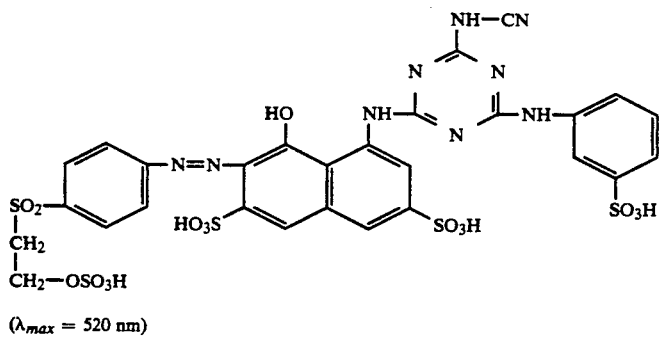

($\lambda_{max}$ = 520 nm)

shows very good fiber-reactive dye properties and produces bluish red dyeings and prints on the materials mentioned in the description, such as, in particular, cellulose fiber materials, by the application and fixation processes customary in the art for fiber-reactive dyes. These dyeings and prints have fastness properties, of which, in particular, the light, perspiration light and chlorine fastnesses may be mentioned. Moreover, it is in particular highly suitable for discharge printing in that pure white patterns are obtained in the bluish red ground shade.

EXAMPLE 1a

To prepare the dye of Example 1 by a different synthetic route, 10.7 parts of cyanamide are added at 0° C. to a suspension of 46 parts of cyanuric chloride in 400 parts of water, and the reaction is carried out at a pH of between 8 and 8.5 by continuous addition of sodium hydroxide solution. 44.5 parts of 3-sulfoaniline are then added, and the second condensation reaction is carried out at a temperature of about 0° C. and a pH of between 2 and 2.5. After about two hours, 73 parts of 1-amino-8-hydroxynaphthalene-3,6-disulfonic acid are added. The third condensation reaction takes place at a pH of 3 and a temperature of 60° C.

After cooling this batch to 20° C., an aqueous diazonium salt suspension prepared in the usual manner and comprising 72.1 parts of 4-( -sulfatoethylsulfonyl)aniline is added to this solution of the coupling component, and the coupling reaction is carried out at a pH of 2 to 2.5.

The dye according to the invention is isolated by the procedure of Example 1. It has the same dye properties.

EXAMPLE 2

23 parts of cyanuric chloride are slowly added at a temperature of 0° C. and a pH of 2 to 36 parts of 1-amino-8-naphthol-3,6-disulfonic acid in 800 parts of water over a period of five minutes. The pH of 2 is maintained for two hours by means of concentrated sodium hydroxide solution. 17.8 parts of 3sulfoaniline are then added with further stirring while maintaining a pH of 2.5 and a temperature of 60° to 80° C., and stirring is continued for some time until no more starting material can be detected by thin-layer chromatography. 4.25 parts of cyanamide are then added, and the condensation reaction is carried out at a temperature of 50° to 60° C. and a pH of 6.5 for about 4 hours.

An aqueous, hydrochloric acid solution of the diazonium salt of 51.1 parts of 2-amino-6-($\beta$-sulfatoethylsulfonyl)naphthalene-1-sulfonic acid prepared in the usual manner is added to the coupling component thus prepared in the synthesis solution, and the coupling reaction is carried out at 15° to 30° C. and a pH of 6.

After clarifying the synthesis solution, the dye according to the invention obtained is isolated at a pH of 5.5 as the alkali metal salt (sodium salt) by spray-drying. Written in the form of the free acid, it has the formula

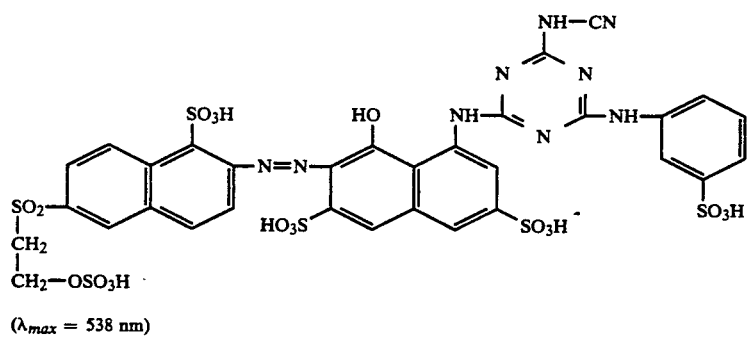

($\lambda_{max}$ = 538 nm)

and shows very good fiber-reactive dye properties. It produces bluish red, fast dyeings and prints of high color strength and a high degree of fixation on, for example, cellulose fiber materials, such as cotton, by the application and fixation processes customary in the art for fiber-reactive dyes. Moreover, the dye is highly usable in discharge and resist printing processes.

Example 3

19 parts of cyanuric chloride are suspended in 300 parts of water. 4.4 parts of cyanamide are added, and the pH is maintained during the reaction between 8 and 9 by means of aqueous sodium hydroxide solution. 58.3 parts of 1-[4'-($\beta$-sulfatoethylsulfonyl)phenyl]-3-carboxy-4-(5''-amino-2''-sulfophenyl)azo-5-pyrazolone are then added, and the reaction is carried out at a pH of 4 and a temperature of 40° C. 17.8 parts of 3-sulfoaniline are then added, the batch is heated to 85° C., and stirring is continued while maintaining a pH of 3.5 to 4 until the condensation reaction has gone to completion.

The azo dye according to the invention formed is isolated in the form of its alkali metal salt (sodium salt) by evaporation of the synthesis solution under reduced pressure or by spray-drying. Written in the form of the free acid, it has the formula

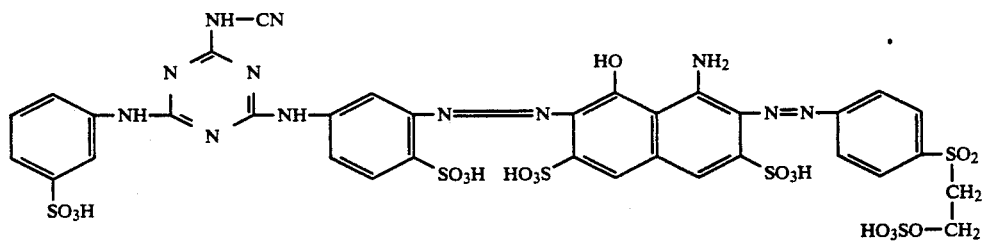

($\lambda_{max}$ = 595 nm)

and exhibits very good fiber-reactive ye . It dyes the materials mentioned in the description, such as, in particular, cellulose fiber materials, by the known application techniques in yellow shades of high color strength and good fastness properties.

EXAMPLE 4

18.8 parts of 1,3-diaminobenzene-4-sulfonic acid are added to a suspension of 19 parts of cyanuric chloride in 200 parts of ice water. The batch is first stirred at 0° to 5° C. and a pH of 2.5 for about two hours and then at 0° to 5° C. and a pH of 4 for about 30 minutes. 4.4 parts of cyanamide are then added, the pH is brought to 10 with sodium hydroxide solution, the temperature is slowly raised to 50° to 60° C., and stirring is continued for about 1.5 hours while maintaining a pH of 10 and a temperature of 50° to 60° C. The pH is then brought to 7 with aqueous hydrochloric acid, 20 parts by volume of an aqueous 5N sodium nitrite solution are added, and diazotization is carried out by slow addition of this batch to a mixture of 50 parts by volume of concentrated hydrochloric acid and 600 parts of ice. The mixture is additionally stirred for about 2 hours, and any excess of nitrous acid is destroyed in the usual manner with sulfamic acid.

The diazonium salt suspension obtained is then added to an aqueous solution of the sodium salt of 60 parts of 4-hydroxy-5-amino-6-[4'-($\beta$-sulfatoethylsulfonyl)-phenylazo]naphthalene-2,7-disulfonic acid. The coupling reaction is carried out at 0° to 10° C. and a pH of 6 to 7, 17.8 parts of 3-sulfoaniline are then added, and the condensation reaction is carried out at 85° C. and a pH of 3.5 to 4 for about 2 hours. The batch is then clarified at about 40° C. using a small amount of kieselguhr, filtered, and the filtrate is evaporated.

A black, electrolyte-containing powder of the alkali metal salt (sodium salt) of the disazo compound of the formula

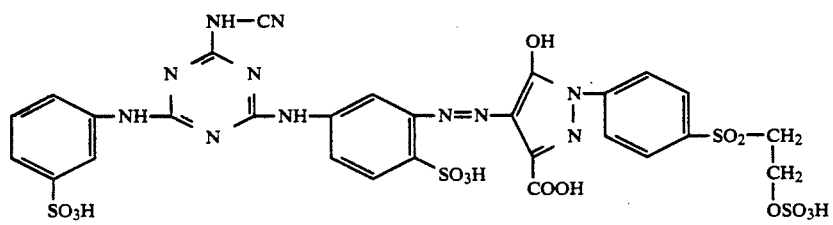

($\lambda_{max}$ = 411 nm)

is obtained. It shows very good fiber-reactive dye properties and dyes, for example, cotton in strong navy shades.

EXAMPLES 5 TO 160

In the Table Examples which follow, further azo dyes according to the invention are described by means of the components of the formula (A)

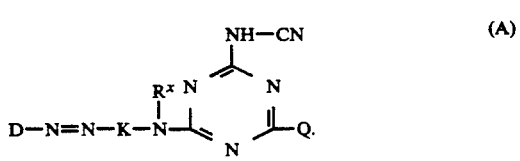

They can be prepared according to the invention, for example analogously to one of the above Examples, using the components apparent from the particular Table Example in combination with the formula (A) (such as the diazo component D—NH$_2$, the coupling component H—K—NR$^x$H, a halotriazine, cyanamide and an amine of the formula H—Q). They exhibit very good fiber-reactive dye properties and dye the materials mentioned in the description, in particular cellulose fiber materials, such as cotton, in the hues given in the particular Table Example (here for cotton) which have high color strength and good fastnesses. Moreover, these azo dyes according to the invention are highly suitable for discharge printing.

| Ex. | Radical D— | Radical —K—N(R$^x$)— | Radical —Q | Hue |
|---|---|---|---|---|
| 5 | 4-($\beta$-sulfato-ethylsulfonyl)-phenyl | 8-hydroxy-3,6-disulfo-1,7-naphthy-lene-1-amino | 3-carboxy-phenylamino | bluish red (521) |

| Ex. | Radical D— | Radical —K—N(R$^x$)— | Radical —Q | Hue |
|---|---|---|---|---|
| 6 | 4-(β-sulfatoethylsulfonyl)phenyl | 8-hydroxy-3,6-disulfo-1,7-naphthylene-1-amino | 3,4-dicarboxyphenylamino | bluish red (519) |
| 7 | 4-(β-sulfatoethylsulfonyl)phenyl | 8-hydroxy-3,6-disulfo-1,7-naphthylene-1-amino | δ-carboxybutylamino | bluish red (520) |
| 8 | 4-(β-sulfatoethylsulfonyl)phenyl | 8-hydroxy-3,6-disulfo-1,7-naphthylene-1-amino | 1-carboxyethyl-1-amino | bluish red (520) |
| 9 | 4-(β-sulfatoethylsulfonyl)phenyl | 8-hydroxy-3,6-disulfo-1,7-naphthylene-1-amino | N-methyl-β-sulfoethylamino | bluish red (523) |
| 10 | 6-(β-sulfatoethylsulfonyl)-1-sulfonaphth-2-yl | 8-hydroxy-3,6-disulfo-1,7-naphthylene-1-amino | N-methyl-β-sulfoethylamino | bluish red (537) |
| 11 | 6-(β-sulfatoethylsulfonyl)-1-sulfonaphth-2-yl | 8-hydroxy-3,6-disulfo-1,7-naphthylene-1-amino | 2,5-disulfophenylamino | bluish red (535) |
| 12 | 6-(β-sulfatoethylsulfonyl)-1-sulfonaphth-2-yl | 8-hydroxy-3,6-disulfo-1,7-naphthylene-1-amino | 2-sulfophenylamino | bluish red (538) |
| 13 | 6-(β-sulfatoethylsulfonyl)-1-sulfonaphth-2-yl | 8-hydroxy-3,6-disulfo-1,7-naphthylene-1-amino | 2-methyl-4,6-disulfophenylamino | bluish red (536) |
| 14 | 6-(β-sulfatoethylsulfonyl)-1-sulfonaphth-2-yl | 8-hydroxy-3,6-disulfo-1,7-naphthylene-1-amino | 4-sulfophenylamino | bluish red (535) |
| 15 | 6-(β-sulfatoethylsulfonyl)-1-sulfonaphth-2-yl | 8-hydroxy-3,6-disulfo-1,7-naphthylene-1-amino | 2-carboxyphenylamino | bluish red (538) |
| 16 | 6-(β-sulfatoethylsulfonyl)-1-sulfonaphth-2-yl | 8-hydroxy-3,6-disulfo-1,7-naphthylene-1-amino | 1-carboxy-3-methyl-n-propyl-1-amino | bluish red (536) |
| 17 | 4-(β-sulfatoethylsulfonyl)phenyl | 8-hydroxy-3,6-disulfo-1,7-naphthylene-1-amino | 2-sulfophenylamino | bluish red (520) |
| 18 | 4-(β-sulfatoethylsulfonyl)phenyl | 8-hydroxy-3,6-disulfo-1,7-naphthylene-1-amino | 4-sulfophenylamino | bluish red (521) |
| 19 | 4-(β-sulfatoethylsulfonyl)phenyl | 8-hydroxy-3,6-disulfo-1,7-naphthylene-1-amino | β-sulfoethylamino | bluish red (519) |
| 20 | 4-(β-sulfatoethylsulfonyl)phenyl | 8-hydroxy-3,6-disulfo-1,7-naphthylene-1-amino | 2,5-disulfophenylamino | bluish red (522) |
| 21 | 4-(β-sulfatoethylsulfonyl)phenyl | 8-hydroxy-3,6-disulfo-1,7-naphthylene-1-amino | 2-carboxyphenylamino | bluish red (520) |
| 22 | 4-(β-sulfatoethylsulfonyl)phenyl | 4-sulfo-3-amino-1,6-phenylene-1-amino | 3-sulfophenylamino | golden yellow (413) |
| 23 | 4-(β-sulfatoethylsulfonyl)phenyl | 4-sulfo-3-amino-1,6-phenylene-1-amino | 4-sulfophenylamino | golden yellow (415) |
| 24 | 4-(β-sulfatoethylsulfonyl)phenyl | 4-sulfo-3-amino-1,6-phenylene-1-amino | β-sulfoethylamino | golden yellow (413) |
| 25 | 4-(β-sulfatoethylsulfonyl)phenyl | 4-sulfo-3-amino-1,6-phenylene-1-amino | 2-carboxyphenylamino | golden yellow (414) |
| 26 | 2-sulfo-40-(β-sulfatoethylsulfonyl)phenyl | 4-sulfo-3-amino-1,6-phenylene-1-amino | 3-sulfophenylamino | golden yellow (408) |
| 27 | 2-sulfo-4-(β-sulfatoethylsulfonyl)phenyl | 4-sulfo-3-amino-1,6-phenylene-1-amino | 2-sulfophenylamino | golden yellow (409) |
| 28 | 3-(β-sulfatoethylsulfonyl)phenyl | 4-sulfo-3-amino-1,6-phenylene-1-amino | 2-sulfophenylamino | bluish red (513) |
| 29 | 3-(β-sulfatoethylsulfonyl)phenyl | 4-sulfo-3-amino-1,6-phenylene-1-amino | 4-sulfophenylamino | bluish red (514) |
| 30 | 3-(β-sulfatoethylsulfonyl)phenyl | 4-sulfo-3-amino-1,6-phenylene-1-amino | β-sulfoethylamino | bluish red (515) |
| 31 | 3-(β-sulfatoethylsulfonyl)phenyl | 4-sulfo-3-amino-1,6-phenylene-1-amino | 2,5-disulfophenylamino | bluish red (514) |
| 32 | 3-(β-sulfatoethylsulfonyl)phenyl | 4-sulfo-3-amino-1,6-phenylene-1-amino | 2-carboxyphenylamino | bluish red (513) |
| 33 | 4-(β-sulfatoethylsulfonyl)phenyl | 8-hydroxy-4,6-disulfo-1,7-naphthylene-1-amino | 3-sulfophenylamino | bluish red (498) |
| 34 | 4-(β-sulfatoethylsulfonyl)phenyl | 8-hydroxy-4,6-disulfo-1,7-naphthylene-1-amino | 4-sulfophenylamino | bluish red (495) |
| 35 | 4-(β-sulfatoethylsulfonyl)phenyl | 8-hydroxy-4,6-disulfo-1,7-naphthylene-1-amino | β-sulfoethylamino | bluish red (502) |
| 36 | 4-(β-sulfatoethylsulfonyl)phenyl | 8-hydroxy-4,6-disulfo-1,7-naphthylene-1-amino | 2-carboxyphenylamino | bluish red (497) |
| 37 | 4-(β-sulfatoethylsulfonyl)phenyl | 8-hydroxy-4,6-disulfo-1,7-naphthylene-1-amino | 3-sulfophenylamino | bluish red (503) |
| 38 | 4-(β-sulfatoethylsulfonyl)phenyl | 8-hydroxy-4,6-disulfo-1,7-naphthylene-1-amino | 2-sulfophenylamino | bluish red (504) |
| 39 | 4-(β-sulfatoethylsulfonyl)phenyl | 3-carboxy-5-pyrazolon-4-yl-1-(2'-sulfophenyl-4'-amino) | 3-carboxyphenylamino | yellow (390) |
| 40 | 4-(β-sulfatoethylsulfonyl)phenyl | 3-carboxy-5-pyrazolon-4-yl-1-(2'-sulfophenyl-4'-amino) | 3,4-dicarboxyphenylamino | yellow (392) |
| 41 | 4-(β-sulfatoethylsulfonyl)phenyl | 3-carboxy-5-pyrazolon-4-yl-1-(2'-sulfophenyl-4'-amino) | δ-carboxybutylamino | yellow (393) |
| 42 | 4-(β-sulfatoethylsulfonyl)phenyl | 3-carboxy-5-pyrazolon-4-yl-1-(2'-sulfophenyl-4'-amino) | 1-carboxyethyl-1-amino | yellow (391) |
| 43 | 4-(β-sulfatoethylsulfonyl)phenyl | 3-carboxy-5-pyrazolon-4-yl-1-(2'-sulfophenyl-4'-amino) | N-methyl-β-sulfoethylamino | yellow (395) |
| 44 | 6-(β-sulfatoethylsulfonyl)-1-sulfonaphth- | 3-carboxy-5-pyrazolon-4-yl-1-(2'- | N-methyl-β-sulfoethylamino | yellow (405) |

| Ex. | Radical D— | Radical —K—N(R$^x$)— | Radical —Q | Hue |
|---|---|---|---|---|
| | 2-yl | sulfophenyl-4'-amino) | | |
| 45 | 6-(β-sulfato-ethylsulfonyl)-1-sulfonaphth-2-yl | 3-carboxy-5-pyrazolon-4-yl-1-(2'-sulfophenyl-4'-amino) | 2,5-disulfo-phenylamino | yellow (407) |
| 46 | 6-(β-sulfato-ethylsulfonyl)-1-sulfonaphth-2-yl | 3-carboxy-5-pyrazolon-4-yl-1-(2'-sulfophenyl-4'-amino) | 2-sulfo-phenylamino | yellow (404) |
| 47 | 6-(β-sulfato-ethylsulfonyl)-1-sulfonaphth-2-yl | 3-carboxy-5-pyrazolon-4-yl-1-(2'-sulfophenyl-4'-amino) | 2-methyl-3,6-disulfo-phenylamino | yellow (404) |
| 48 | 6-(β-sulfato-ethylsulfonyl)-1-sulfonaphth-2-yl | 3-carboxy-5-pyrazolon-4-yl-1-(2'-sulfophenyl-4'-amino) | 4-sulfo-phenylamino | yellow (405) |
| 49 | 6-(β-sulfato-ethylsulfonyl)-1-sulfonaphth-2-yl | 3-carboxy-5-pyrazolon-4-yl-1-(2'-sulfophenyl-4'-amino) | 2-carboxy-phenyl-amino | yellow (403) |
| 50 | 6-(β-sulfato-ethylsulfonyl)-1-sulfonaphth-2-yl | 3-carboxy-5-pyrazolon-4-yl-1-(2'-sulfophenyl-4'-amino) | 1-carboxy-3-methyl-n-propyl-1-amino | yellow (405) |
| 51 | 4-(β-sulfato-ethylsulfonyl)-phenyl | 8-hydroxy-6-sulfo-3,7-naphthylene-3-amino | 2-sulfo-phenylamino | orange |
| 52 | 4-(β-sulfato-ethylsulfonyl)-phenyl | 8-hydroxy-6-sulfo-3,7-naphthylene-3-amino | 4-sulfo-phenylamino | orange |
| 53 | 4-(β-sulfato-ethylsulfonyl)-phenyl | 8-hydroxy-6-sulfo-3,7-naphthylene-3-amino | β-sulfo-ethylamino | orange |
| 54 | 4-(β-sulfato-ethylsulfonyl)-phenyl | 8-hydroxy-6-sulfo-3,7-naphthylene-3-amino | 2,5-disulfo-phenylamino | orange |
| 55 | 4-(β-sulfato-ethylsulfonyl)-phenyl | 8-hydroxy-6-sulfo-3,7-naphthylene-3-amino | 2-carboxy-phenylamino | orange |
| 56 | 6-(β-sulfato-ethylsulfonyl)-1-sulfonaphth-2-yl | 8-hydroxy-6-sulfo-3,7-naphthylene-3-amino | 3-sulfo-phenylamino | orange |
| 57 | 6-(β-sulfato-ethylsulfonyl)-1-sulfonaphth-2-yl | 8-hydroxy-6-sulfo-3,7-naphthylene-3-amino | 4-sulfo-phenylamino | orange |
| 58 | 6-(β-sulfato-ethylsulfonyl)-1-sulfonaphth-2-yl | 8-hydroxy-6-sulfo-3,7-naphthylene-3-amino | β-sulfo-ethylamino | orange |
| 59 | 6-(β-sulfato-ethylsulfonyl)-1-sulfonaphth-2-yl | 8-hydroxy-6-sulfo-3,7-naphthylene-3-amino | 2-carboxy-phenylamino | orange |
| 60 | 6-(β-sulfato-ethylsulfonyl)-1-sulfonaphth-2-yl | 8-hydroxy-6-sulfo-3,7-naphthylene-3-amino | 2-sulfo-phenylamino | orange |
| 61 | 6-(β-sulfato-ethylsulfonyl)-1-sulfonaphth-2-yl) | 4-sulfo-3-amino-1,6-phenylene-1-amino | 3-sulfo-phenylamino | golden yellow (425) |
| 62 | 6-(β-sulfato-ethylsulfonyl)-1-sulfonaphth-2-yl) | 4-sulfo-3-amino-1,6-phenylene-1-amino | 4-sulfo-phenylamino | golden yellow (427) |
| 63 | 6-(β-sulfato-ethylsulfonyl)-1-sulfonaphth-2-yl | 4-sulfo-3-amino-1,6-phenylene-1-amino | β-sulfo-ethylamino | golden yellow (430) |
| 64 | 6-(β-sulfato-ethylsulfonyl)-1-sulfonaphth-2-yl | 4-sulfo-3-amino-1,6-phenylene-1-amino | 2-carboxy-phenylamino | golden yellow (427) |
| 65 | 6-(β-sulfato-ethylsulfonyl)-1-sulfonaphth-2-yl) | 4-sulfo-3-amino-1,6-phenylene-1-amino | 2-sulfo-phenylamino | golden yellow (428) |
| 66 | 4-methoxy-3-(β-sulfatoethyl-sulfonyl)phenyl | 8-hydroxy-6-sulfo-2,7-naphthylene-2-amino | 2-sulfo-phenylamino | scarlet |
| 67 | 4-methoxy-3-(β-sulfatoethyl-sulfonyl)phenyl | 8-hydroxy-6-sulfo-2,7-naphthylene-2-amino | 4-sulfo-phenylamino | scarlet |
| 68 | 4-methoxy-3-(β-sulfatoethyl-sulfonyl)phenyl | 8-hydroxy-6-sulfo-2,7-naphthylene-2-amino | β-sulfo-ethylamino | scarlet |
| 69 | 4-methoxy-3-(β-sulfatoethyl-sulfonyl)phenyl | 8-hydroxy-6-sulfo-2,7-naphthylene-2-amino | 2,5-disulfo-phenylamino | scarlet |
| 70 | 4-methoxy-3-(β-sulfatoethyl-sulfonyl)phenyl | 8-hydroxy-6-sulfo-2,7-naphthylene-2-amino | 2-carboxy-phenylamino | scarlet |
| 71 | 4-methoxy-3-(β-sulfatoethyl-sulfonyl)phenyl | 8-hydroxy-6-sulfo-2,7-naphthylene-2-amino | 3-sulfo-phenylamino | scarlet |
| 72 | 4-methoxy-3-(β-sulfatoethyl-sulfonyl)phenyl | 8-hydroxy-6-sulfo-2,7-naphthylene-2-amino | δ-carboxy-butylamino | scarlet |
| 73 | 4-methoxy-3-(β-sulfatoethyl-sulfonyl)phenyl | 8-hydroxy-6-sulfo-2,7-naphthylene-2-amino | 1-carboxy-ethyl-1-amino | scarlet |
| 74 | 4-methoxy-3-(β-sulfatoethyl-sulfonyl)phenyl | 8-hydroxy-6-sulfo-2,7-naphthylene-2-amino | 4-carboxy-phenylamino | scarlet |
| 75 | 4-methoxy-3-(β-sulfatoethyl-sulfonyl)phenyl | 8-hydroxy-6-sulfo-2,7-naphthylene-2-amino | 3,4-dicar-boxyphenyl-amino | scarlet |
| 76 | 2,5-dimethoxy-4-(β-sulfato-ethylsulfonyl)-phenyl | 3-methyl-5-pyrazolon-4-yl-1-(2'-sulfophenyl-4'-amino) | 2-sulfo-phenylamino | golden yellow (430) |
| 77 | 2,5-dimethoxy-4-(β-sulfato-ethylsulfonyl)-phenyl | 3-methyl-5-pyrazolon-4-yl-1-(2'-sulfophenyl-4'-amino) | 4-sulfo-phenylamino | golden yellow (432) |
| 78 | 2,5-dimethoxy-4-(β-sulfato-ethylsulfonyl)-phenyl | 3-methyl-5-pyrazolon-4-yl-1-(2'-sulfophenyl-4'-amino) | β-sulfo-ethylamino | golden yellow (433) |
| 79 | 2,5-dimethoxy-4-(β-sulfato-ethylsulfonyl)-phenyl | 3-methyl-5-pyrazolon-4-yl-1-(2'-sulfophenyl-4'-amino) | 2,5-disulfo-phenylamino | golden yellow (431) |
| 80 | 2,5-dimethoxy-4-(β-sulfato-ethylsulfonyl)-phenyl | 3-methyl-5-pyrazolon-4-yl-1-(2'-sulfophenyl-4'-amino) | 2-carboxy-phenylamino | golden yellow (430) |
| 81 | 2,5-dimethoxy-4-(β-sulfato-ethylsulfonyl)- | 3-methyl-5-pyrazolon-4-yl-1-(2'- | 3-sulfo-phenylamino | golden yellow (432) |

-continued

| Ex. | Radical D— | Radical —K—N(R$^x$)— | Radical —Q | Hue |
|---|---|---|---|---|
| | phenyl | sulfophenyl-4'-amino) | | |
| 82 | 2,5-dimethoxy-4-(β-sulfato-ethylsulfonyl)-phenyl | 3-methyl-5-pyrazolon-4-yl-1-(phenyl-4'-amino) | 4-sulfo-phenylamino | golden yellow (435) |
| 83 | 2,5-dimethoxy-4-(β-sulfato-ethylsulfonyl)-phenyl | 3-methyl-5-pyrazolon-4-yl-1-(phenyl-4'-amino) | 2-carboxy-phenylamino | golden yellow (435) |
| 84 | 2,5-dimethoxy-4-(β-sulfato-ethylsulfonyl)-phenyl | 3-methyl-5-pyrazolon-4-yl-1-(phenyl-4'-amino) | β-sulfo-ethylamino | golden yellow (432) |
| 85 | 2,5-dimethoxy-4-(β-sulfato-ethylsulfonyl)-phenyl | 3-methyl-5-pyrazolon-4-yl-1-(phenyl-4'-amino) | 2-carboxy-phenylamino | golden yellow (433) |
| 86 | 2,5-dimethoxy-4-(β-sulfato-ethylsulfonyl)-phenyl | 3-methyl-5-pyrazolon-4-yl-1-(phenyl-4'-amino) | 3-sulfo-phenylamino | golden yellow (437) |
| 87 | 2,5-dimethoxy-4-(β-sulfato-ethylsulfonyl)-phenyl | 3-methyl-5-pyrazolon-4-yl-1-(phenyl-4'-amino) | 2-sulfo-phenylamino | golden yellow (430) |
| 88 | 8-(β-sulfato-ethylsulfonyl)-naphth-2-yl | 8-hydroxy-3,6-disulfo-1,7-naphthylene-1-amino | 3-carboxy-phenylamino | bordeaux (546) |
| 89 | 8-(β-sulfato-ethylsulfonyl)-naphth-2-yl | 8-hydroxy-3,6-disulfo-1,7-naphthylene-1-amino | 3-sulfo-phenylamino | bordeaux (546) |
| 90 | 8-(β-sulfato-ethylsulfonyl)-naphth-2-yl | 8-hydroxy-3,6-disulfo-1,7-naphthylene-1-amino | β-sulfo-phenylamino | bordeaux (546) |
| 91 | 8-(β-sulfato-ethylsulfonyl)-naphth-2-yl | 8-hydroxy-3,6-disulfo-1,7-naphthylene-1-amino | 2,5-disulfo-phenylamino | bordeaux (547) |
| 92 | 6-sulfo-8-(β-sulfatoethyl-sulfonyl)naphth-2-yl | 8-hydroxy-3,6-disulfo-1,7-naphthylene-1-amino | 2,5-disulfo-phenylamino | bordeaux (531) |
| 93 | 6-sulfo-8-(β-sulfatoethyl-sulfonyl)naphth-2-yl | 8-hydroxy-3,6-disulfo-1,7-naphthylene-1-amino | 3-sulfo-phenylamino | bordeaux (534) |
| 94 | 6-sulfo-8-(β-sulfatoethyl-sulfonyl)naphth-2-yl | 8-hydroxy-3,6-disulfo-1,7-naphthylene-1-amino | 2-carboxy-phenylamino | bordeaux (532) |
| 95 | 6-sulfo-8-(β-sulfatoethyl-sulfonyl)naphth-2-yl | 8-hydroxy-3,6-disulfo-1,7-naphthylene-1-amino | δ-carboxy-butylamino | bordeaux (535) |
| 96 | 6-sulfo-8-(β-sulfatoethyl-sulfonyl)naphth-2-yl | 8-hydroxy-3,6-disulfo-1,7-naphthylene-1-(amino-carbonyl-phenyl-4'-amino) | 3-sulfo-phenylamino | red (502) |
| 97 | 6-sulfo-8-(β-sulfatoethyl-sulfonyl)naphth-2-yl | 8-hydroxy-3,6-disulfo-1,7-naphthylene-1-(amino-carbonyl-phenyl-4'-amino) | 2-carboxy-phenylamino | red (503) |
| 98 | 6-sulfo-8-(β-sulfatoethyl-sulfonyl)naphth-2-yl | 8-hydroxy-3,6-disulfo-1,7-naphthylene-1-(amino-carbonyl-phenyl-4'-amino) | 4-sulfo-phenylamino | red (504) |
| 99 | 6-sulfo-8-(β-sulfatoethyl-sulfonyl)naphth-2-yl | 8-hydroxy-3,6-disulfo-1,7-naphthylene-1-(amino-carbonyl-phenyl-4'-amino) | 2,6-disulfo-phenylamino | red (503) |
| 100 | 8-(β-sulfato-ethylsulfonyl)-naphth-2-yl | 8-hydroxy-3,6-disulfo-1,7-naphthylene-1-(amino-carbonyl-phenyl-4'-amino) | 3-sulfo-phenylamino | red (518) |
| 101 | 8-(β-sulfato-ethylsulfonyl)-naphth-2-yl | 8-hydroxy-3,6-disulfo-1,7-naphthylene-1-(amino-carbonyl-phenyl-4'-amino) | 2-carboxy-phenylamino | red (516) |
| 102 | 8-(β-sulfato-ethylsulfonyl)-naphth-2-yl | 8-hydroxy-3,6-disulfo-1,7-naphthylene-1-(amino-carbonyl-phenyl-4'-amino) | β-sulfo-ethylamino | red (520) |
| 103 | 8-(β-sulfato-ethylsulfonyl)-naphth-2-yl | 8-hydroxy-3,6-disulfo-1,7-naphthylene-1-(amino-carbonyl-phenyl-4'-amino) | 2,5-disulfo-phenylamino | red (517) |
| 104 | 8-(β-sulfato-ethylsulfonyl)-naphth-2-yl | 8-hydroxy-3,6-disulfo-1,7-naphthylene-1-(amino-carbonyl-phenyl-4'-amino) | 3-phosphono-phenylamino | red (518) |
| 105 | 1-sulfo-6-(β-sulfatoethyl-sulfonyl)naphth-2-yl | 8-hydroxy-3,6-disulfo-1,7-naphthylene-1-(amino-carbonyl-phenyl-4'-amino) | 3-phosphono-phenylamino | red (501) |
| 106 | 1-sulfo-6-(β-sulfatoethyl-sulfonyl)naphth-2-yl | 8-hydroxy-3,6-disulfo-1,7-naphthylene-1-(amino-carbonyl-phenyl-4'-amino) | 3-sulfo-phenylamino | red (505) |
| 107 | 1-sulfo-6-(β-sulfatoethyl-sulfonyl)naphth-2-yl | 8-hydroxy-3,6-disulfo-1,7-naphthylene-1-(amino-carbonyl-phenyl-4'-amino) | 2-carboxy-phenylamino | red (506) |

-continued

| Ex. | Radical D— | Radical —K—N(R$^x$)— | Radical —Q | Hue |
|---|---|---|---|---|
| 108 | 1-sulfo-6-(β-sulfatoethylsulfonyl)naphth-2-yl | 8-hydroxy-3,6-disulfo-1,7-naphthylene-1-(aminocarbonylphenyl-4'-amino) | 2,5-disulfophenylamino | red (503) |
| 109 | 1-sulfo-6-(β-sulfatoethylsulfonyl)naphth-2-yl | 8-hydroxy-3,6-disulfo-1,7-naphthylene-1-(aminocarbonylphenyl-4'-amino) | β-sulfoethylamino | red (504) |
| 110 | 3-(β-sulfatoethylsulfonyl)phenyl | 8-hydroxy-3,6-disulfo-1,7-naphthylene-1-(aminocarbonylphenyl-4'-amino) | β-sulfoethylamino | red (500) |
| 111 | 3-(β-sulfatoethylsulfonyl)phenyl | 8-hydroxy-3,6-disulfo-1,7-naphthylene-1-(aminocarbonylphenyl-4'-amino) | 3-sulfophenylamino | red (502) |
| 112 | 3-(β-sulfatoethylsulfonyl)phenyl | 8-hydroxy-3,6-disulfo-1,7-naphthylene-1-(aminocarbonylphenyl-4'-amino) | 2-carboxyphenylamino | red (501) |
| 113 | 3-(β-sulfatoethylsulfonyl)phenyl | 8-hydroxy-3,6-disulfo-1,7-naphthylene-1-(aminocarbonylphenyl-4'-amino) | β-sulfoethylamino | red (499) |
| 114 | 3-(β-sulfatoethylsulfonyl)phenyl | 8-hydroxy-3,6-disulfo-1,7-naphthylene-1-amino | 4-carboxyphenylamino | reddish blue |
| 115 | 3-(β-sulfatoethylsulfonyl)phenyl | 8-hydroxy-3,6-disulfo-1,7-naphthylene-1-amino | 3-sulfophenylamino | reddish blue |
| 116 | 6-(β-sulfatoethylsulfonyl)-1-sulfonaphth-2-yl | 8-hydroxy-3,6-disulfo-1,7-naphthylene-1-amino | 3-carboxyphenylamino | reddish blue |
| 117 | 6-(β-sulfatoethylsulfonyl)-1-sulfonaphth-2-yl | 8-hydroxy-3,6-disulfo-1,7-naphthylene-1-amino | 4-carboxyphenylamino | reddish blue |
| 118 | 6-(β-sulfatoethylsulfonyl)-1-sulfonaphth-2-yl | 8-hydroxy-4,6-disulfo-1,7-naphthylene-1-amino | 3-sulfophenylamino | reddish blue |
| 119 | 6-(β-sulfatoethylsulfonyl)-1-sulfonaphth-2-yl | 8-hydroxy-4,6-disulfo-1,7-naphthylene-1-amino | 2-sulfophenylamino | reddish blue |
| 120 | 6-(β-sulfatoethylsulfonyl)-1-sulfonaphth-2-yl | 8-hydroxy-4,6-disulfo-1,7-naphthylene-1-amino | 4-sulfophenylamino | reddish blue |
| 121 | 6-(β-sulfatoethylsulfonyl)-1-sulfonaphth-2-yl | 8-hydroxy-4,6-disulfo-1,7-naphthylene-1-amino | 2-carboxyphenylamino | reddish blue |
| 122 | 6-(β-sulfatoethylsulfonyl)-1-sulfonaphth-2-yl | 8-hydroxy-4,6-disulfo-1,7-naphthylene-1-amino | 3-carboxyphenylamino | reddish blue |
| 123 | 6-(β-sulfatoethylsulfonyl)-1-sulfonaphth-2-yl | 8-hydroxy-4,6-disulfo-1,7-naphthylene-1-amino | 4-carboxyphenylamino | reddish blue |
| 124 | 6-(β-sulfatoethylsulfonyl)-1-sulfonaphth-2-yl | 8-hydroxy-4,6-disulfo-1,7-naphthylene-1-amino | 2,5-disulfophenylamino | reddish blue |
| 125 | 6-(β-sulfatoethylsulfonyl)-1-sulfonaphth-2-yl | 8-hydroxy-4,6-disulfo-1,7-naphthylene-1-amino | β-sulfoethylamino | reddish blue |
| 126 | 8-(β-sulfatoethylsulfonyl)naphth-2-yl | 8-hydroxy-4,6-disulfo-1,7-naphthylene-1-amino | 3-sulfophenylamino | reddish blue |
| 127 | 8-(β-sulfatoethylsulfonyl)naphth-2-yl | 8-hydroxy-4,6-disulfo-1,7-naphthylene-1-amino | 4-sulfophenylamino | reddish blue |
| 128 | 8-(β-sulfatoethylsulfonyl)naphth-2-yl | 8-hydroxy-4,6-disulfo-1,7-naphthylene-1-amino | 2-sulfophenylamino | reddish blue |
| 129 | 8-(β-sulfatoethylsulfonyl)naphth-2-yl | 8-hydroxy-4,6-disulfo-1,7-naphthylene-1-amino | 3-carboxyphenylamino | reddish blue |
| 130 | 8-(β-sulfatoethylsulfonyl)naphth-2-yl | 8-hydroxy-4,6-disulfo-1,7-naphthylene-1-amino | 2-carboxyphenylamino | reddish blue |
| 131 | 8-(β-sulfatoethylsulfonyl)naphth-2-yl | 8-hydroxy-4,6-disulfo-1,7-naphthylene-1-amino | 4-carboxyphenylamino | reddish blue |
| 132 | 8-(β-sulfatoethylsulfonyl)naphth-2-yl | 8-hydroxy-4,6-disulfo-1,7-naphthylene-1-amino | 2,5-disulfophenylamino | reddish blue |
| 133 | 8-(β-sulfatoethylsulfonyl)naphth-2-yl | 8-hydroxy-4,6-disulfo-1,7-naphthylene-1-amino | β-sulfoethylamino | reddish blue |
| 134 | 8-(β-sulfatoethylsulfonyl)naphth-2-yl | 8-hydroxy-4,6-disulfo-1,7-naphthylene-1-amino | N-methyl-(β-sulfoethyl)-amino | reddish blue |
| 135 | 8-(β-sulfatoethylsulfonyl)-6-sulfonaphth-2-yl | 8-hydroxy-4,6-disulfo-1,7-naphthylene-1-amino | 3-sulfophenylamino | reddish blue |
| 136 | 8-(β-sulfatoethylsulfonyl)-6-sulfonaphth-2-yl | 8-hydroxy-4,6-disulfo-1,7-naphthylene-1-amino | 4-sulfophenylamino | reddish blue |
| 137 | 8-(β-sulfatoethylsulfonyl)-6-sulfonaphth-2-yl | 8-hydroxy-4,6-disulfo-1,7-naphthylene-1-amino | 2-sulfophenylamino | reddish blue |
| 138 | 8-(β-sulfatoethylsulfonyl)-6-sulfonaphth-2-yl | 8-hydroxy-4,6-disulfo-1,7-naphthylene-1-amino | β-sulfoethylamino | reddish blue |
| 139 | 8-(β-sulfatoethylsulfonyl)-6-sulfonaphth-2-yl | 8-hydroxy-4,6-disulfo-1,7-naphthylene-1-amino | N-methyl-(β-sulfoethyl)-amino | reddish blue |
| 140 | 8-(β-sulfatoethylsulfonyl)-6-sulfonaphth-2-yl | 8-hydroxy-4,6-disulfo-1,7-naphthylene-1-amino | 2,5-disulfophenylamino | reddish blue |
| 141 | 8-(β-sulfatoethylsulfonyl)-3,6-disulfo-6-sulfonaphth-2-yl | 8-hydroxy-3,6-disulfo-1,7-naphthylene-1-amino | 2,5-disulfophenylamino | reddish blue |

| Ex. | Radical D— | Radical —K—N(R$^x$)— | Radical —Q | Hue |
|---|---|---|---|---|
| 142 | 8-(β-sulfatoethylsulfonyl)-6-sulfonaphth-2-yl | 8-hydroxy-3,6-disulfo-1,7-naphthylene-1-amino | 3-sulfophenylamino | reddish blue |
| 143 | 8-(β-sulfatoethylsulfonyl)-6-sulfonaphth-2-yl | 8-hydroxy-3,6-disulfo-1,7-naphthylene-1-amino | 2-sulfophenylamino | reddish blue |
| 144 | 8-(β-sulfatoethylsulfonyl)-6-sulfonaphth-2-yl | 8-hydroxy-3,6-disulfo-1,7-naphthylene-1-amino | 4-sulfophenylamino | reddish blue |
| 145 | 8-(β-sulfatoethylsulfonyl)-6-sulfonaphth-2-yl | 8-hydroxy-3,6-disulfo-1,7-naphthylene-1-amino | 2-carboxyphenylamino | reddish blue |
| 146 | 8-(β-sulfatoethylsulfonyl)-6-sulfonaphth-2-yl | 8-hydroxy-3,6-disulfo-1,7-naphthylene-1-amino | 3-carboxyphenylamino | reddish blue |
| 147 | 8-(β-sulfatoethylsulfonyl)-6-sulfonaphth-2-yl | 8-hydroxy-3,6-disulfo-1,7-naphthylene-1-amino | 4-carboxyphenylamino | reddish blue |
| 148 | 8-(β-sulfatoethylsulfonyl)-6-sulfonaphth-2-yl | 8-hydroxy-3,6-disulfo-1,7-naphthylene-1-amino | β-sulfoethylamino | reddish blue |
| 149 | 8-(β-sulfatoethylsulfonyl)-6-sulfonaphth-2-yl | 8-hydroxy-3,6-disulfo-1,7-naphthylene-1-amino | N-methyl-(β-sulfoethyl)-amino | reddish blue |
| 150 | 8-(β-sulfatoethylsulfonyl)-6-sulfonaphth-2-yl | 8-hydroxy-3,6-disulfo-1,7-naphthylene-1-amino | 4-carboxybutylamino | reddish blue |
| 151 | 8-(β-sulfatoethylsulfonyl)-naphth-2-yl | 8-hydroxy-3,6-disulfo-1,7-naphthylene-1-amino | 3-sulfophenylamino | bordeaux |
| 152 | 8-(β-sulfatoethylsulfonyl)-naphth-2-yl | 8-hydroxy-3,6-disulfo-1,7-naphthylene-1-amino | 2-sulfophenylamino | bordeaux |
| 153 | 8-(β-sulfatoethylsulfonyl)-naphth-2-yl | 8-hydroxy-3,6-disulfo-1,7-naphthylene-1-amino | 4-sulfophenylamino | bordeaux |
| 154 | 8-(β-sulfatoethylsulfonyl)-naphth-2-yl | 8-hydroxy-3,6-disulfo-1,7-naphthylene-1-amino | 2-carboxyphenylamino | bordeaux |
| 155 | 8-(β-sulfatoethylsulfonyl)-naphth-2-yl | 8-hydroxy-3,6-disulfo-1,7-naphthylene-1-amino | 4-carboxyphenylamino | bordeaux |
| 156 | 8-(β-sulfatoethylsulfonyl)-naphth-2-yl | 8-hydroxy-3,6-disulfo-1,7-naphthylene-1-amino | 3-carboxyphenylamino | bordeaux |
| 157 | 8-(β-sulfatoethylsulfonyl)-naphth-2-yl | 8-hydroxy-3,6-disulfo-1,7-naphthylene-1-amino | 2,5-disulfophenylamino | bordeaux |
| 158 | 8-(β-sulfatoethylsulfonyl)-naphth-2-yl | 8-hydroxy-3,6-disulfo-1,7-naphthylene-1-amino | β-sulfoethylamino | bordeaux |
| 159 | 8-(β-sulfatoethylsulfonyl)-naphth-2-yl | 8-hydroxy-3,6-disulfo-1,7-naphthylene-1-amino | N-methyl-(β-sulfoethyl)-amino | bordeaux |
| 160 | 8-(β-sulfatoethylsulfonyl)-naphth-2-yl | 8-hydroxy-3,6-disulfo-1,7-naphthylene-1-amino | 4-carboxybutylamino | bordeaux |

EXAMPLES 161 TO 166

In the Table Examples which follow, further azo dyes according to the invention are described by means of the components of the formula (B)

$$\text{(B)}$$

(structure with NH—CN group, triazine ring, and Q—N, N—D—N=N—K substituents, R$^x$ on N)

They can be prepared according to the invention, for example analogously to one of the above Working Examples, using the components apparent from the particular Table Example in combination with the formula (B) (such as a diaminophenylene or -naphthylene of the formula HR$^x$N—D—NH$_2$, the coupling component H—K, a halotriazine, cyanamide and an amine of the formula H—Q). They exhibit very good fiber-reactive dye properties and dye the materials mentioned in the description, in particular cellulose fiber materials, such as cotton, in the hues given in the particular Table Example (here for cotton) which have high color strength and good fastnesses. Moreover, these azo dyes according to the invention are highly suitable for discharge and resist printing.

| Ex. | Radical —Q | Radical —D | Radical —K | Hue |
|---|---|---|---|---|
| 161 | 2-sulfophenylamino | 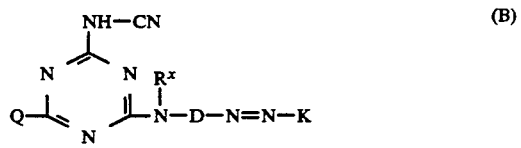 | 1-[4'-(β-sulfatoethylsulfonyl)-phenyl]-3-methyl-5-pyrazolon-4-yl | yellow (415) |
| 162 | 4-sulfophenylamino | " | 1-[4'-(β-sulfatoethylsulfonyl)-phenyl]-3-methyl-5-pyrazolon-4-yl | yellow (417) |
| 163 | β-sulfoethylamino | " | 1-[4'-(β-sulfatoethylsulfonyl)-phenyl]-3-methyl-5-pyrazolon-4-yl | yellow (420) |
| 164 | 2,5-disulfophenylamino | " | 1-[4'-(β-sulfatoethylsulfonyl)-phenyl]-3-methyl-5-pyrazolon-4-yl | yellow (413) |
| 165 | 2-carboxyphenylamino | " | 1-[4'-(β-sulfatoethylsulfonyl)-phenyl]-3-methyl-5-pyrazolon-4-yl | yellow (417) |
| 166 | 3-sulfophenylamino | " | 1-[4'-(β-sulfatoethylsulfonyl)-phenyl]-3-methyl-5-pyrazolon-4-yl | yellow (419) |

EXAMPLE 167

98.5 parts of the copper phthalocyanine compound of the formula

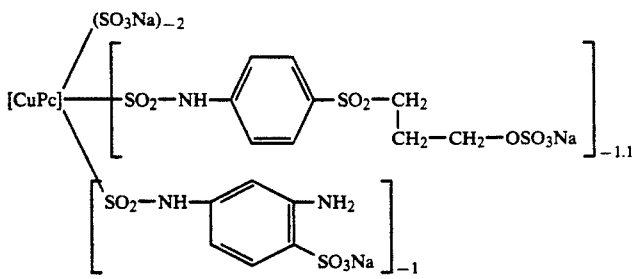

are stirred in a mixture of 600 parts of ice and 600 parts of water until a homogeneous mixture is achieved, which is then brought to a pH of 7 with sodium hydroxide solution. 19 parts of cyanuric chloride dissolved in a small amount of acetone are added, and the condensation reaction is carried out at 0° to 5° C. and a pH of 3.5 to 4 with further stirring. 4.4 parts of cyanamide are then added, the temperature is slowly raised to 50° to 60° C., and the pH is brought to 10 with sodium hydroxide solution, stirring is continued until this second condensation reaction has gone to completion, and the mixture is then neutralized with aqueous hydrochloric acid until a pH of 5 is reached. 17.8 parts of 3-sulfoaniline are added, and the batch is stirred at 80° to 90° C. and a pH of 3.5 to 4 for about 2.5 hours. The synthesis solution is clarified at a pH of 5.5 with kieselguhr while it is still hot, and the filtrate is evaporated under reduced pressure.

A blue electrolyte-containing powder of the alkali metal salt (sodium salt) of the compound of the formula

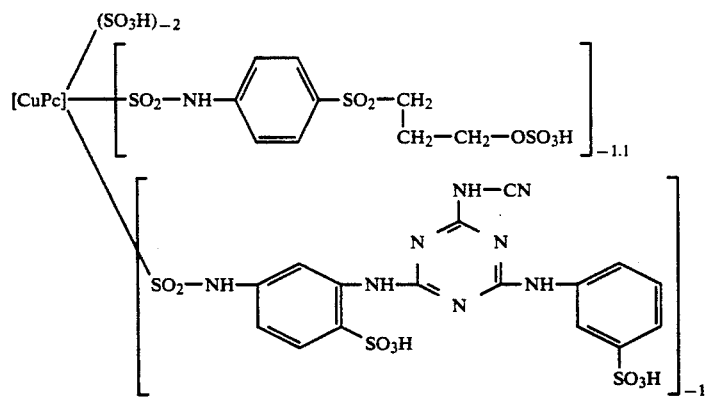

is obtained.

The copper phthalocyanine dye according to the invention shows an absorption maximum in the visible region at 672 nm; it has very good fiber-reactive dye properties and dyes the materials mentioned in the description, such as, in particular, cellulose fiber materials, by the customary application and fixation processes in light greenish blue hues of high color strength and good fastness properties.

We claim:
1. A dye of the formula

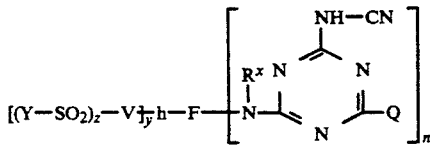

in which
F is the radical of a monoazo, disazo or polyazo dye or of a heavy metal complex azo dye derived therefrom or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dye;

$R^x$ is a hydrogen atom or an alkyl group of 1 to 4 carbon atoms, which can be substituted by halogen, hydroxy, cyano, alkoxy of 1 to 4 carbon atoms, alkoxycarbonyl of 2 to 5 carbon atoms, carboxy, sulfamoyl, sulfo or sulfato;

n is the number 1 or 2;
Q is a group of the formula

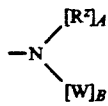

in which
$R^z$ is a hydrogen atom or an alkyl group of 1 to 4 carbon atoms, which can be substituted by halogen, hydroxy, cyano, alkoxy of 1 to 4 carbon atoms, carboxy, sulfamoyl, sulfo or sulfato or by a phenyl radical which is unsubstituted or substituted by substituents from the group comprising halogen, alkoxy of 1 to 4 carbon atoms, alkyl of 1 to 4 carbon atoms, sulfo and carboxy, or is a cyclohexyl radical or a phenyl radical which is unsubstituted or substituted by substituents from the group comprising halogen, alkoxy of 1 to 4 carbon atoms, alkyl of 1 to 4 carbon atoms, sulfo and carboxy, W is an aryl, alkylenearyl, arylenealkyl, alkylenearylenealkyl or arylenea radical substituted by 1 to 4 water-solubilizing substituents, the alkylene radicals or alkyl radicals being those having 1 to 8 carbon atoms which can additionally be substituted by other substituents; and the arylene radicals and aryl radicals being phenylene or naphthylene radicals and phenyl or naphthyl radicals which are unsubstituted or additionally substituted by other substituents, and the alkylene radicals can be interrupted by 1 or more hetero groups selected from —NH—, —N(R)— where R is alkyl of 1 to 4 carbon atoms unsubstituted or substituted by sulfo, carboxy, sulfato, phenyl or sulfophenyl, —O—, —S—, —SO$_2$—, —CO—, —SO$_2$—NH—, —NH—SO$_2$—, —NH—CO— and —CO—NH—, and the alkylene and arylene moieties and alkyl and aryl moieties in the combined alkyl(ene)/aryl(ene) radicals can be separated from one another in each case by such a group, A is the number zero or 1, and B is the number 1 or 2, the sum of (A+B) being the number 2, and the groups of the formula —W—(—SO$_2$—Y)$_z$ in the case where B is 2, have meanings which are identical to or different from one another;

V is a direct bond or an alkylene group or is a substituted or unsubstituted arylene radical or an alkylenearylene or arylenealkylene or alkylenearylenealkylene or arylenealkylenearylene radical, or is an arylenearylene radical which is interrupted by one of the hetero groups listed below, the alkylene radicals having 1 to 8 carbon atoms and can be substituted and the arylene radicals are substituted or unsubstituted phenylene or naphthylene radicals, and the alkylene radicals can be interrupted by 1 or more hetero groups selected from —NH—, —N(R)— where R is alkyl of 1 to 4 carbon atoms unsubstituted or substituted by sulfo, carboxy, sulfato, phenyl or sulfophenyl, —O—, —S—, —SO$_2$—, —CO—, —SO$_2$—NH—, —NH—SO$_2$—, —NH—CO— and —CO—NH—, and the alkylene and arylene moieties in the combined alkylene/arylene radicals can be separated from one another by such a hetero group;

y is the number 1 or 2;

z is the number 1 or 2;

h is a nitrogen atom in the case where y is 2, or is a group of the formula —NH—, —N(R)—, —N(R)— where R as one of the abovementioned meanings, —NH—CO—NH—, —NH—CO— or —CO—NH— or a direct bond in the case where y is 1;

Y is a vinyl group, or is an ethyl group substituted in the β position by a substituent which is eliminated by alkali, and the group(s) —SO$_2$—Y are bound directly to an aromatic carbon atom of F or V or via an alkylene radical of 1 to 4 carbon atoms, or via an alkylamino group of 1 to 4 carbon atoms.

2. A dye as claimed in claim 1 of the formula

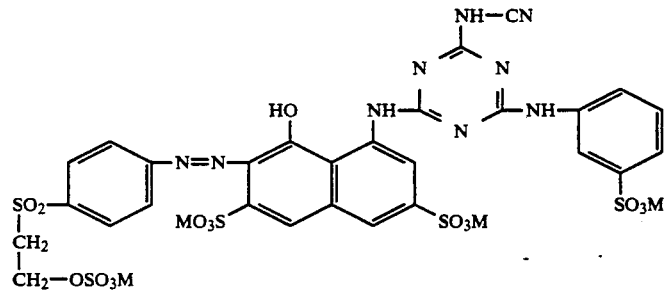

in which M is hydrogen or an alkali metal.

3. A dye as claimed in claim 1 of the formula

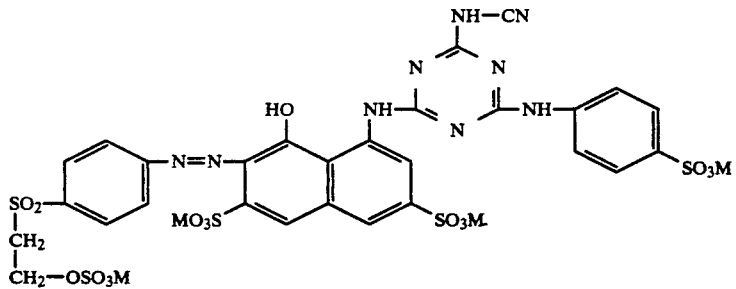

in which M is hydrogen or an alkali metal.

4. A dye as claimed in claim 1 of the formula (12B)

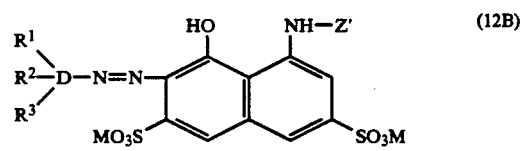

in which the radical $R^1R^2R^3D$— is a 1-sulfo-6-(β-sulfatoethylsulfonyl)naphth-2-yl radical, $Z^1$ is a 2-cyanamido-4-(3'-sulfophenyl)amino-1,3,5-triazin-6-yl or a 2-cyanamido-4-(4'-sulfophenyl)amino-1,3,5-triazin-6-yl group and M is hydrogen or an alkali metal.

5. A dye as claimed in claim 1 of the formula (12A)

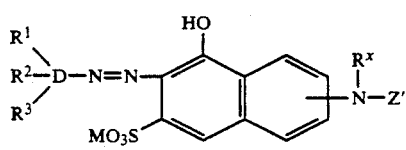

in which the radical $R^1R^2R^3D-$ is a 1-sulfo-6-($\beta$-sulfatoethylsulfonyl)naphth-2-yl radical, $R^x$ is hydrogen, the group $-N(R^x)-Z^1$ is bound in the 3 position of the 8-naphthol radical, $Z^1$ is a 2-cyanamido-4-(3'-sulfophenyl)amino-1,3,5-triazin-6-yl or a 2-cyanamido-4-(4'-sulfophenyl)amino-1,3,5-triazin-6-yl group and M is hydrogen or an alkali metal.

6. A dye as claimed in claim 1 of the formula (12A)

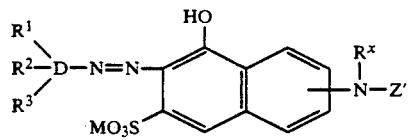

in which the radical $R^1R^2R^3D-$ is a 4-($\beta$-sulfatoethylsulfonyl)phenyl radical, $R^x$ is hydrogen, the group $-N(R^x)-Z^1$ is bound in the 3 position of the 8-naphthol radical, $Z^1$ is a 2-cyanamido-4-(3'-sulfophenyl)-amino-1,3,5-triazin-6-yl or a 2-cyanamido-4-(4'-sulfophenyl) amino-1,3,5-triazin-6-yl group and M is hydrogen or an alkali metal.

7. A dye as claimed in claim 1 of the formula (12V)

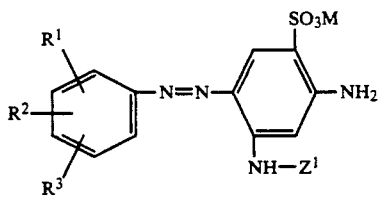

in which $R^1$ is bound to the benzene ring in the para position relative to the azo group and is a $\beta$-sulfatoethylsulfonyl group, $R^2$ and $R^3$ are both a hydrogen atom, $Z^1$ is a 2-cyanamido-4-(3'-sulfophenyl)amino-1,3,5-triazin-6-yl or a 2-cyanamido-4-(4'-sulfophenyl) amino-1,3,5-triazin-6-yl group and M is hydrogen or an alkali metal.

8. A dye as claimed in claim 1 of the formula (12L)

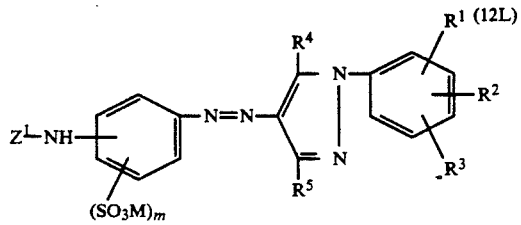

in which $R^4$ is hydroxy, $R^5$ is methyl, $R^1$ is $\beta$-sulfatoethylsulfonyl and bound to the benzene ring in the para position relative to the nitrogen atom of the pyrazole radical; $R^2$ and $R^3$ are both hydrogen, $Z^1$ is a 2-cyanamido-4-(3'-sulfophenyl)amino-1,3,5-triazin-6-yl or a 2-cyanamido-4-(4'-sulfophenyl) amino-1,3,5-triazin-6-yl group and M is hydrogen or an alkali metal, m is the number 1, and the group $-SO_3M$ is bound to the benzene ring in the ortho position relative to the azo group, and the group $Z^1H-$ is bound to the benzene ring in the meta position relative to the azo group and in the para position relative to the sulfo group.

9. A dye according to claim 1, wherein $R^x$ is methyl, ethyl or hydrogen.

10. A dye according to claim 1, wherein n is 1.

* * * * *

UNITED STATES PATENT AND TRADEMARK OFFICE
CERTIFICATE OF CORRECTION

PATENT NO. : 5,225,544
DATED : July 6, 1993
INVENTOR(S) : Dannheim, et. al.

It is certified that error appears in the above-indentified patent and that said Letters Patent is hereby corrected as shown below:

Column 47, claim 1, line 7, the word "arylenea" should be --arylenealkylenearyl--.

Column 50, claim 8, line 38, "$Z^1H-$" should be -- $Z^1NH-$ --.

Signed and Sealed this

Fifteenth Day of March, 1994

Attest:

BRUCE LEHMAN

Attesting Officer     Commissioner of Patents and Trademarks